United States Patent [19]

Kato

[11] Patent Number: 5,204,948
[45] Date of Patent: Apr. 20, 1993

[54] METHOD AND APPARATUS FOR EVALUATING COLOR IMAGE SIGNALS

[75] Inventor: Haruo Kato, Sapporo, Japan

[73] Assignee: Advantest Corporation, Tokyo, Japan

[21] Appl. No.: 576,860

[22] Filed: Sep. 4, 1990

[30] Foreign Application Priority Data

| Sep. 8, 1989 | [JP] | Japan | 1-233668 |
| Sep. 8, 1989 | [JP] | Japan | 1-233669 |
| Sep. 13, 1989 | [JP] | Japan | 1-237656 |
| Sep. 13, 1989 | [JP] | Japan | 1-237657 |
| Mar. 7, 1990 | [JP] | Japan | 1-56065 |
| Mar. 7, 1990 | [JP] | Japan | 2-56066 |

[51] Int. Cl.$^5$ .................. G06F 15/20; H04N 1/46; G09G 1/28
[52] U.S. Cl. .................. 395/162; 358/75; 358/80; 340/703
[58] Field of Search .......... 358/75, 80; 340/703; 395/162

[56] References Cited

U.S. PATENT DOCUMENTS

| 4,694,286 | 9/1987 | Bergstedt | 340/703 |
| 4,768,089 | 8/1988 | Kato | 358/80 |
| 4,805,016 | 2/1989 | Kato | 358/80 |
| 4,819,077 | 4/1989 | Kikuchi et al. | 358/80 |
| 4,864,357 | 9/1989 | Matsumawa et al. | 358/80 |
| 4,928,167 | 5/1990 | Tatsumi et al. | 358/80 |
| 5,028,991 | 7/1991 | Sekizawa et al. | 358/80 |

Primary Examiner—Dale M. Shaw
Assistant Examiner—Kee M. Tung
Attorney, Agent, or Firm—Staas & Halsey

[57] ABSTRACT

In the present invention saturation is averaged for each pixel block of a predetermined size and a maximum saturation value is obtained for each of a predetermined number of block sizes. A sum total of maximum mean saturation values is obtained, basic chromaticity corresponding to the sum total is determined, and saturation values are each corrected by a hue of the corresponding pixel. X and Y correlation coefficient coordinates of the pixel positions having greater saturation values than a reference saturation value are obtained for each color, and a slanted striped pattern factor is determined corresponding to the correlation coefficient. The width of a striped pattern is detected for each color, the sum of the saturation values within the pattern width, a standard deviation of the pixel positions weighted by the saturation values and the number of pixels within the pattern width are multiplied, and a border striped pattern is determined corresponding to the multiplied value. The width of the striped pattern is similarly detected. A center striped pattern factor is determined corresponding to a value obtained by dividing the product of the sum of saturation values and the deviation of saturation by the standard deviation of pixel positions. Evaluated values of these color reproduction errors are multiplied by predetermined coefficients, respectively, and the sum total is obtained and is compared with a reference value to determine the quality of a color image signal.

16 Claims, 15 Drawing Sheets

METHOD AND APPARATUS FOR EVALUATING COLOR IMAGE SIGNALS

BACKGROUND OF THE INVENTION

The present invention relates to a method for the quantitative evaluation of color image signals available from, for example, charge coupled device (CCD) color image sensors fabricated as a semiconductor IC. The invention also pertains to a color image signal evaluating apparatus utilizing the above-mentioned quantitative evaluation method.

In recent years there have been put to practical use CCD color image sensors which have mosaic color filters or stripe color filters coated on their front for creating color image signals. The CCD is produced using semiconductor IC techniques but it may sometimes be defective from various causes in its manufacturing process. Moreover, a positioning error or geometric misalignment is often induced when printing the color filter on the CCD in the fabrication of the color image sensor. Reproducing a color image signal derived from such an image sensor, the picture suffers various color reproduction errors owing to defects of the image sensor itself and geometric misalignment of the color filter. For instance, in the case where monochromatic light with no pattern, such as standard white light, is shed evenly all over the image receiving surface of the image sensor, (1) a slanted pattern of colored stripes appears in the reproduced picture, (2) a colored pattern of vertical or horizontal stripes appears in the reproduced picture, or (3) the reproduced picture is colored over a wide area.

In conventional testing of color image sensors, test personnel visually inspect the picture quality of a display image provided on a CRT display screen based on the color image signal from each image sensor and determine whether or not the above-mentioned color reproduction errors are each within a predetermined limit range. Hence, the traditional quality conformance inspection of color image sensors in the past was inefficient and many test personnel were needed for quality inspection of image sensors at the mass-production site, in particular. Besides, such evaluation of the picture quality is subjective and hence is inevitably subject to an individual checker's judgment as to the afore-mentioned color reproduction errors. This poses a problem that image sensors having passed inspection vary greatly the in their quality as to the color reproduction.

SUMMARY OF THE INVENTION

It is therefore an object of the present invention to provide a method for quantitatively evaluating various color reproduction errors of a color image signal from a color image sensor and a color image signal evaluating apparatus employing the quantitative evaluating method.

According to a first aspect of the present invention, the color image signal of one frame is transformed to saturation image data, which is stored in a saturation image memory. The image data of one frame in the saturation image memory is divided into blocks each consisting of m×n pixels. The saturation data in the saturation image memory is read out therefrom and the saturation is averaged for each block to find a maximum one of the mean saturation values. Similar maximum mean saturation values are obtained for a predetermined number of block sizes and the sum total of these maximum mean saturation values is obtained as a detected basic chromaticity.

According to a second aspect of the present invention, the color image signal is transformed to hue image data as well as to the saturation image data, and the hue image data is stored in a hue image memory. The hue image data is read out from the pixel position in the hue image memory corresponding to the saturation image data read out in the above-mentioned basic chromaticity detecting step, the saturation image data is corrected based on the hue image data read out, and the basic chromaticity is obtained using the corrected saturation image data in the same manner as mentioned above.

According to a third aspect of the present invention, the color image signal is transformed to hue image data and saturation image data, which are stored in the hue image memory and the saturation image memory, respectively. The saturation image data at each pixel position is read out from the saturation image memory, and the hue image data at a pixel position where the corresponding saturation value is greater than a reference saturation value is read out of the hue image memory. The color represented by the hue image data thus read out is identified and a "1" is written in the corresponding pixel position of a color matrix memory corresponding to the color being identified. A correlation coefficient regarding X and Y coordinates of the pixel positions in each color matrix memory where the "1s" have been written is calculated and a value corresponding to the correlation coefficient is obtained as a slanted striped pattern factor.

According to a fourth aspect of the present invention, the color image signal is transformed to hue image data and saturation image data, which are stored in the hue image memory and the saturation image memory, respectively. The saturation image data at each pixel position is read out of the saturation image memory, and the hue image data at a pixel position where the corresponding saturation value is greater than a reference saturation value is read out of the hue image memory. The color represented by the hue image data thus read out is identified, a "1" is written in the corresponding pixel position of a color matrix memory corresponding to the color being identified, and at the same time, the read-out saturation image data is stored in the corresponding pixel position of a color saturation memory of the corresponding color. The stored contents of each color matrix memory are integrated in the X and Y directions to obtain X and Y integrated counts, which are weighted so that they are heavily weighted in the peripheral portion of the picture. On the other hand, saturation data stored in the color saturation memory of each color are integrated in the Y and X directions to obtain X and Y integrated saturation values. The position where the integrated saturation exceeds a reference value at either side of each of the X and Y coordinates where the weighted X and Y integrated counts are maximum is defined as the border or edge of the striped pattern in its widthwise direction. The sum of the saturation values in the striped pattern in the widthwise direction and a standard deviation of saturation in the peripheral portion are calculated, and further, the integrated counts in the striped pattern in the widthwise direction are added. A value corresponding to the product of the sum of the saturation values, the standard deviation and the sum of the integrated counts is obtained as a peripheral striped pattern factor.

According to a fifth aspect of the present invention, the color image signal is transformed to hue image data and saturation image data, which are stored in the hue image memory and the saturation image memory, respectively. The saturation image data at each pixel position is read out of the saturation image memory and the hue image data at a pixel position where the corresponding saturation value is greater than a reference value is read out of the hue image memory. The color represented by the read-out hue image data is identified and a "1" is written into the corresponding pixel position of the corresponding color matrix memory. At the same time, a value corresponding to the saturation image data is stored in the corresponding pixel position of a color saturation memory of the color being identified. The stored contents of each color matrix memory are integrated in the Y and X directions to obtain X and Y integrated counts, which are weighted so that they are heavily weighted in the center of the picture. On the other hand, the values stored in each color saturation memory are integrated in the Y and X directions to obtain X and Y integrated saturation values, and the position where the integrated saturation value exceeds the reference value at either side of each of the X and Y coordinates where the weighted X and Y integrated counts are maximum is defined as the border of the striped pattern in the widthwise direction. The sum of the saturation values in the striped pattern in the widthwise direction and a standard deviation of saturation at the center of the picture are calculated. Further, a standard positional deviation of the central pixel where a "1" has been written is obtained. The product of the sum of the saturation values and the standard deviation of saturation is divided by the standard positional deviation and a value corresponding to the result of the division is obtained as a center striped pattern factor.

According to a sixth aspect of the present invention, the outputs of a plurality of color evaluating units are each multiplied by a predetermined coefficient and then their sum total is obtained. The sum thus obtained is compared with a reference value to determine whether the color image signal is good or not.

DESCRIPTION OF THE PREFERRED EMBODIMENTS

Figure 1:
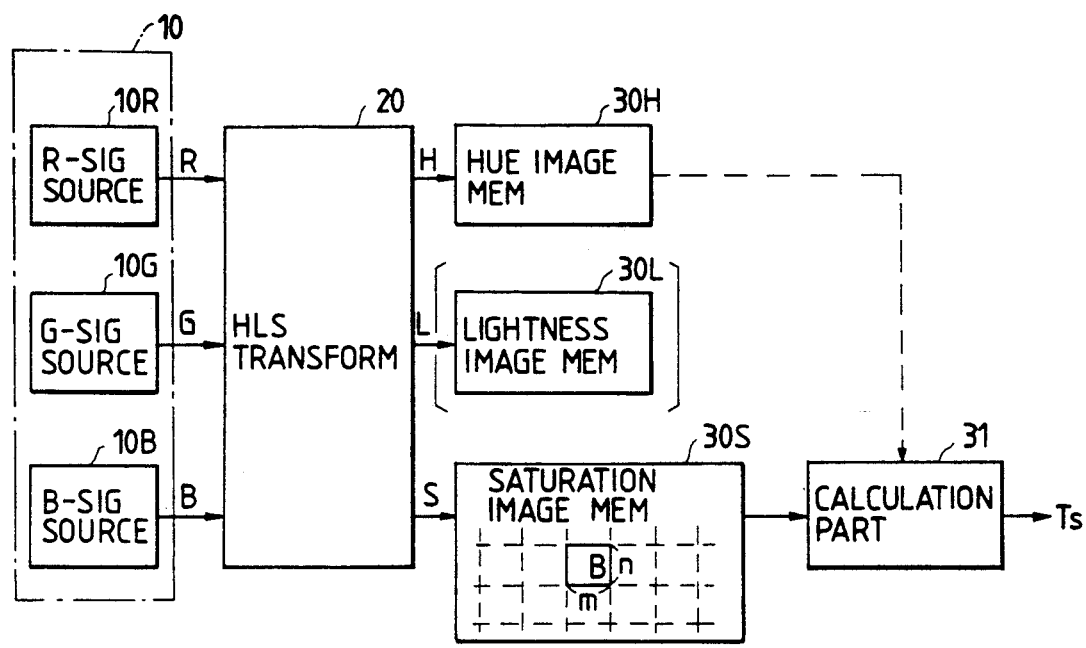
FIG. 1 is a block diagram of an apparatus for evaluating basic chromaticity according to a first embodiment of the present invention.

FIG. 1 is a block diagram of a color image signal evaluating apparatus for evaluating the basic chromaticity through utilization of a color image signal evaluating method according to a first embodiment of the present invention. The basic chromaticity herein mentioned is a measure for evaluating a color reproduction error of an image which is formed on the display screen of a color CRT by red, green and blue monochromatic signals from an image sensor irradiated uniformly all over its image receiving surface with standard white light having no patterns, and which is wholly or partly colored very lightly with a certain color.

In FIG. 1 reference numeral 10 indicates a color image signal source obtained from the output of a color image sensor such as a color CCD. The color image signal source 10 may included outputs 10R, 10G and 10B which are obtained by converting R,G and B signals from the color image sensor into digital form by means of A/D converters, or may include memories 10R, 10G and 10B each having stored therein such digital signals for one frame.

This first embodiment will be described in connection with the case where the color image signal source 10 includes the memories 10R, 10G and 10B. In this instance, a color image signal created by applying non-patterned standard white light evenly all over the image receiving surface of a color image sensor, for example, is separated into red, green and blue monochromatic signals (hereinafter referred to simply as R,G and B signals) and R,G and B image signal data obtained by A-D converting the monochromatic signals are stored in the three memories 10R, 10G and 10B, respectively.

The color image data, R, G and B read out of the color image data source 10 are provided to and a hue, lightness and saturation (HLS) transform part 20, wherein they are transformed to hue image data H, lightness image data L and saturation image data S.

The hue image data H is represented by angles from 0 to 360 degrees. For instance, angles from 0° to 30° and from 330° to 360° represent red; 30° to 90° represent yellow; 90° to 150° represent green; 150° to 210° represent cyan; 210° to 270° represent blue; and 270° to 330° represent magenta. The respective colors may sometimes be classified by numbers having 12 bits.

The lightness represents the brightness of the display image and the saturation represents the vividness of its color. They are each expressed by a value ranging 0 to 1.0. An algorithm for calculating from the hue H, the lightness L and the saturation S of a color from the levels of the R, G and B signals, that is, an HLS transform algorithm, is well-known; hence no description will be given of the algorithm. The HLS transformation may be replaced with a hue, saturation and value (HSV) transformation or the like which is approximately equivalent thereto.

The hue image data H, the lightness image data L and the saturation image data S of one frame obtained in the HSL transform part 20 are stored in hue, lightness and saturation image memories 30H, 30L and 30S, respectively.

For the evaluation of basic chromaticity according to the first embodiment of the present invention, the hue image memory 30H and the lightness image memory 30L are unnecessary, because only the saturation image data S stored in the saturation image memory 30S is used.

Figure 2:
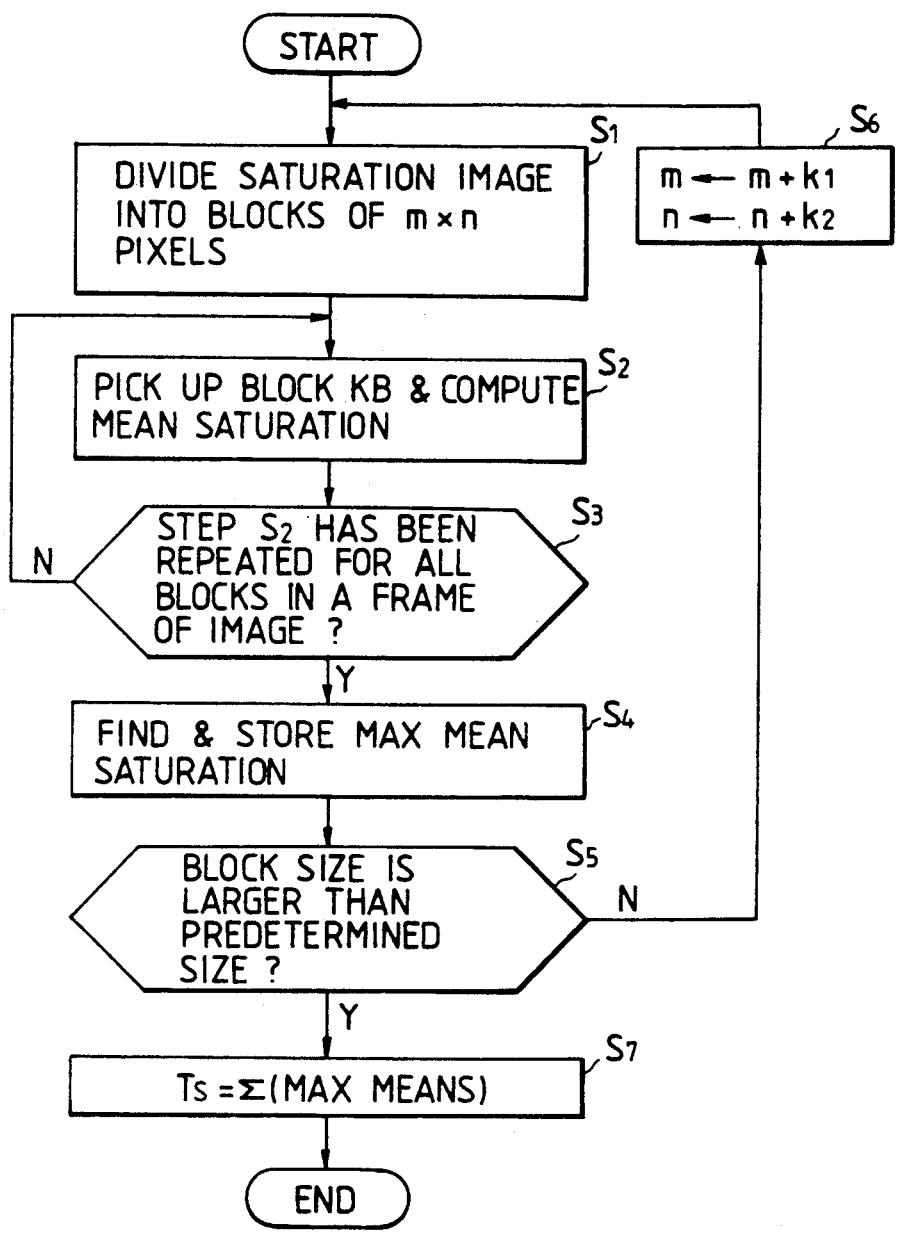
FIG. 2 is a flowchart showing a process for detecting the basic chromaticity by the apparatus shown in FIG. 1.

As shown in the flowchart of FIG. 2, a calculation part 31 divides, in step $S_1$, the saturation image data S in the, saturation image memory 30S into blocks B each comprising $m \times n$ pixels and, in step $S_2$, the calculation part 31 reads out the saturation image data S for each block and calculates mean saturation in each block KB. In step $S_3$ it is determined whether or not the saturation image data has been read out for all the blocks, and if not, the process returns to step $S_2$. In this way, the process is performed over the entire area of the picture without overlapping of the blocks KB. The number of pixels, $m \times n$, of each block KB is initially about $10 \times 10$, for example.

Thereafter, in step $S_4$ a maximum one of the mean saturation values in the frame is extracted and stored. In step $S_5$ it is determined whether or not the size of the block KB has exceeded a predetermined value, and if not, the block size, $m \times n$, is changed such that $m = m + K_1$ and $n = n + K_2$ in step $S_6$. Then, the process goes back to step $S_1$ and in steps $S_2$ and $S_3$ the mean saturation of each block is obtained again over the entire picture frame, after which a maximum mean saturation is extracted.

As described above, each time the size of the block KB is changed, the mean saturation of each block KB is obtained over the entire area of the picture and a maximum mean saturation value for the frame is extracted and stored in steps $S_1$ through $S_5$.

When it is determined in step $S_5$ that the block size becomes such that the frame the image can contain, for example, four blocks, the process proceeds to step $S_7$, in which the sum of all the maximum mean saturation values obtained until then is calculated. The calculation part 31 outputs the sum as the basic chromaticity Ts.

Since the block size is gradually changed as mentioned above, a certain colored local pattern, for instance, provides a fixed maximum mean saturation value until the block size, becomes about the same size as the colored pattern. As the block size becomes larger than the size of the colored local pattern, the mean saturation of the block containing the colored local pattern gradually drops. On the other hand, the basic chromaticity over the entire picture provides substantially constant maximum mean saturation corresponding to its strength or intensity independently of the change in the block size. It can be determined, therefore, that the smaller the sum of the maximum mean saturation values, Ts, the less the basic chromaticity in terms of the size and intensity of the colored pattern.

Figure 3:
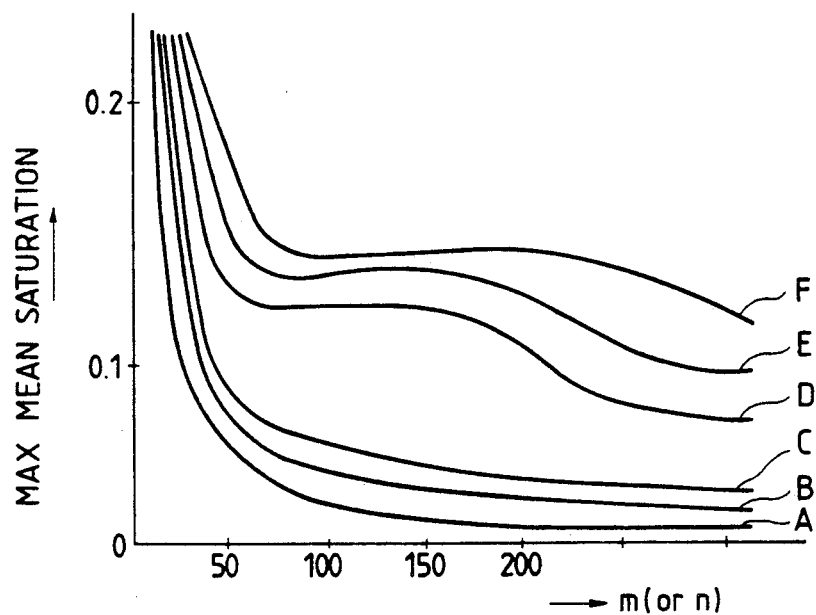
FIG. 3 is a graph showing examples of variations of a maximum mean saturation with block sizes in the apparatus of FIG. 1.

FIG. 3 shows a graph in which the maximum mean saturation values of the block KB for respective block sizes are plotted based on measured data for various color image sensors A to F. The sum of the maximum mean 7 saturation values, Ts, obtained in step $S_6$ represents the area surrounded by each of the curves A through F and the horizontal coordinate axis. There is a tendency that the color image sensors under test are good when they present characteristics close to a monotone decreasing function, that is, when the maximum mean saturation rapidly decreases with an increase in the block size m or n as indicated by the curves A, B and C. The color image sensors are no good when their characteristics are such as indicated by the curves D, E and F.

As described above, according to the present invention, the saturation image data is divided into the blocks KB, the mean saturation is calculated for each block, the maximum mean saturation value for the frame is obtained for each block size, the maximum mean saturation values thus obtained are accumulated, and the accumulated value is provided as the basic chromaticity. The basic chromaticity is compared with a criterion of the quality of color image sensors. The color image sensors are determined to be good or no good, depending on whether the basic chromaticity is lower or higher than the criterion. Hence, the determination is made unequivocally. Accordingly, a quality inspection more reliable than a visual inspection can be achieved and the inspection can be effected automatically This permits a larger number of devices in a shorter time, and hence achieves labor savings.

While in the above the process ends when the block size is reduced down to ¼, the block size in this instance is not limited specifically thereto but may also be set to an arbitrary value. Moreover, the blocks are described so as not to overlap but the same results could be obtained even if the blocks overlap.

It will easily be understood that the present invention is applicable not only to the test of semiconductor color image sensors but also as a method and apparatus for evaluating color image signals.

In the above-described embodiment according to the first embodiment of the present invention only the saturation data is used to define the basic chromaticity for determining the presence or absence of the color reproduction error. The human color sensitivity differs with colors, and the reproducibility of colors scatters owing to different characteristics of color filters coated on the image sensors. That is, a specific color is emphasized or deemphasized according to the model of the color image sensor used.

In determining the presence or absence of a color reproduction error based solely on the saturation value, there is the possibility of determining if "color shading is present" even if the saturation value is large due to the presence a color reproduction error in a color to which the human eyes are not sensitive.

According to the second aspect the present invention, basic chromaticity free from the above defect is detected as a measure for evaluating color reproduction error. To this end, the hue image memory 30H in FIG. 1, though not used in embodiment, is employed and the hue image data read out of the hue image memory 30H is provided to the calculation part 31 as indicated by the broken line in FIG. 1.

Figure 4:
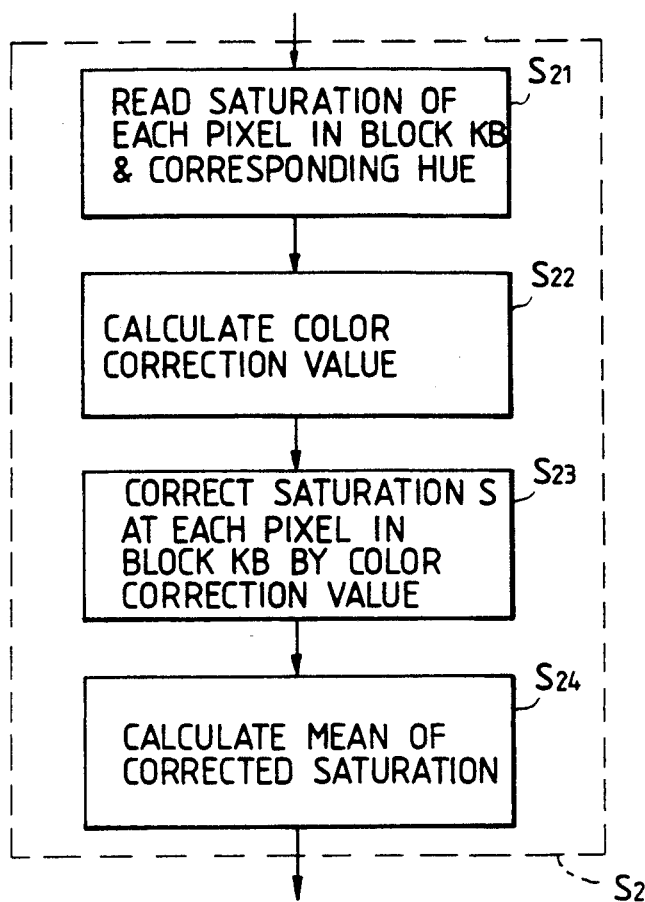
FIG. 4 is a flowchart showing a process for detecting the basic chromaticity according to a second embodiment of the present invention.

According to a second embodiment of the present invention, when the mean saturation of each block KB in the saturation image memory 30S is obtained in step $S_2$ of the flowchart shown in FIG. 2, hue values at pixel positions corresponding to pixels forming the block KB are read out from the hue image memory 30H, color correction values are computed from the read-out hue values and are used to correct the saturation values of pixels forming the block KB, and the saturation values thus corrected are averaged to thereby compute the mean saturation of the block KB. FIG. 4 shows the flow of this process. In step $S_{21}$ the saturation values of m×n pixels forming each block KB are read out from the saturation image memory 30S, and at the same time, hue values H are read out of the hue image memory 30H at the corresponding pixel positions. In step $S_{22}$ color correction values F are obtained from the hue values H.

Figure 5:
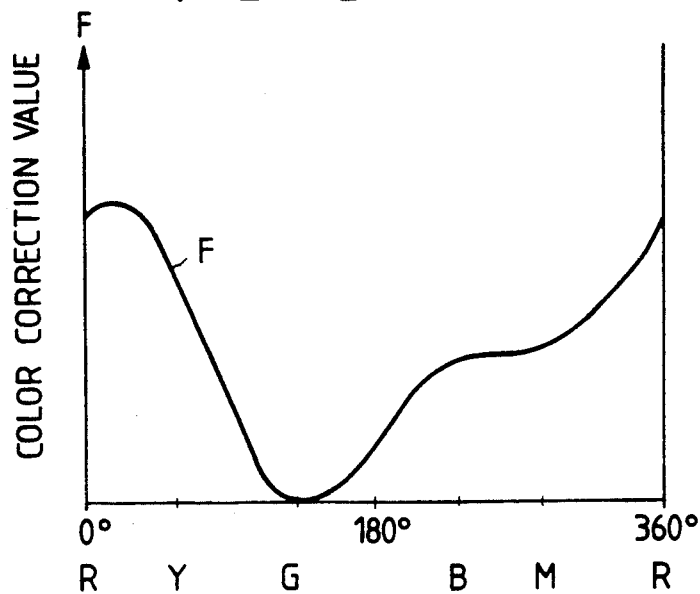
FIG. 5 is a graph showing an example of the relationship between hue and a correcting value.

The color correction value F in step $S_{22}$ is given, for example, by $$F = A_0 + \sum_{i=1}^{h} A_i \cos(i \cdot H + B_i) \quad (1)$$

where in $A_0$, $A_i$ and $B_i$ are coefficients. FIG. 5 shows the characteristic of the color correction value F in the case where h=2, $A_0$=2.0, $A_1$=1.0, $A_2$=0.5, $B_1$=10 and $B_2$=300. By suitably selecting the values of h, $A_0$, $A_i$ and $B_i$, the correction characteristic shown in FIG. 5 can be set to a desired characteristic.

In step $S_{23}$ the saturation value S is multiplied by the color correction value F to obtain a corrected saturation In step $S_{24}$ the corrected saturation value is used to compute the mean saturation of each block KB.

After the mean saturation of each block KB having the block size m×n is calculated over the entire image frame as in steps $S_2$ and $S_3$ depicted in FIG. 2, a maximum mean saturation value is selected in step $S_4$, and in step $S_6$ such maximum mean saturation values obtained in steps $S_1$ through $S_5$ are added together. Instead of adding together all the maximum mean saturation values at one time in step $S_6$, they may also be added one by one in step $S_4$.

Upon request, the basic chromaticity Ts, which is the result of the addition, is compared with a reference value. The basic chromaticity above the reference value means no good and the basic chromaticity below the reference value means good.

As described above, according to the second aspect of the present invention, in the case of obtaining the mean saturation, the saturation value at each pixel is corrected by a color correction value obtained from the hue value at the pixel position, by which it is possible to make the decision in conformity to human color sensitivity or the characteristic of the color filter mounted on the front of the image sensor.

Since the color correction value F can be set to a desired value for each color as shown in FIG. 5, by a suitable selection of the value h shown in Eq. (1), the criterion can be set for each color in accordance with the color characteristics of the color signal from the device under test. Accordingly, a striped pattern of a color not so strong in terms of the human color sensitivity can be declared to be negligible even though its mean saturation value is large, and a striped pattern of a pale color but easily noticeable can be declared no good. This enables, for example, CCD manufacturers to classify color image sensors according to their own criteria.

Although in the above the color correction value is calculated for each pixel, it is also possible to adopt a method in which the hue image memory 30H is also divided into blocks KB as is the case with the saturation image memory 30S. A color correction value F is obtained from the mean saturation of each block KB through use of Eq. (1).

Also it is possible to employ an arrangement in which curves for determining the color correction value F are prestored in a memory and a curve having various characteristics is called, as required, for converting the hue value to the color correction value.

Figure 6:
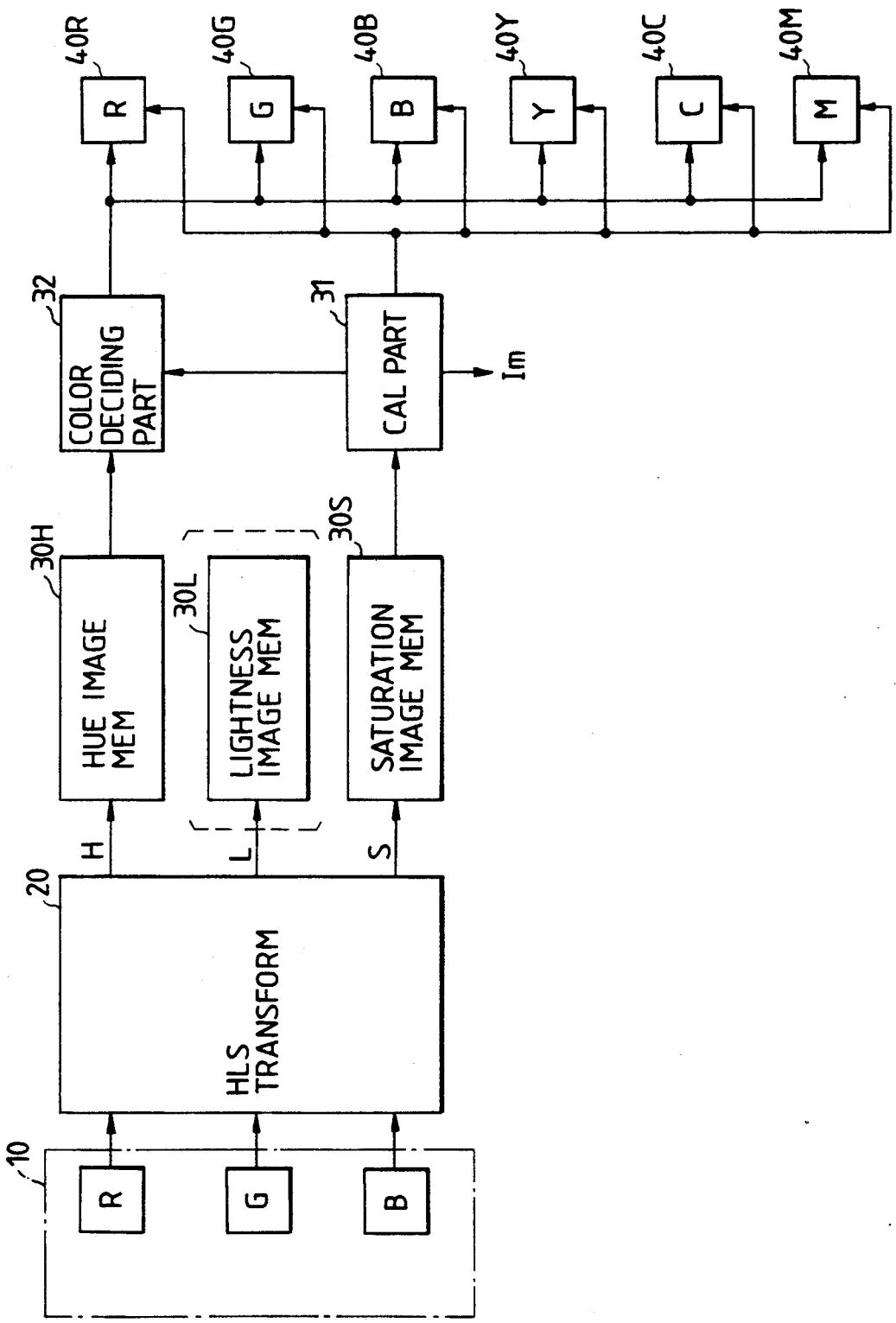
FIG. 6 is a block diagram of an apparatus for evaluating a slanted pattern factor according to a third embodiment of the present invention.

FIG. 6 is a block diagram of a color image signal evaluating apparatus for evaluating a slanted striped pattern according to a third embodiment of the present invention.

In FIG. 6 reference numeral 10 indicates a color image signal source which is the output of a color image sensor such as a color CCD (not shown), as in the case of FIG. 1. For instance, standard white light is irradiated over the entire area of the image receiving surface of the color image sensor. As a result of this, the red, green and blue signals R, G and B are provided from the color image signal source 10 separately of one another.

The respective monochromatic signals R, G and B thus output from the color image signal source 10 are transformed by the HLS transform part 20 to hue image data and saturation image data.

The hue image data H and the saturation image data S of one frame, thus obtained from the HLS transform part 20, are stored in the hue image memory 30H and the saturation image memory 30S, respectively. That is, letting the number of all pixels forming one frame be represented by N, N pieces of hue image data H and N pieces of saturation image data S are loaded into the memories 30H and 30S. FIG. 6 shows an arrangement in which the lightness image data L is also obtained. The lightness image data L is stored in the lightness image memory 30L.

Only the saturation data stored in the memory 30S which are above a reference value are used for the evaluation of the color image signal. The reference saturation value may be the mean saturation value per pixel for the entire saturation data stored in the memory 30S. The means saturation value per pixel is obtained by multiplying the mean saturation value by a fixed coefficient, or a certain predetermined value equal to or greater than 0 regardless of the saturation data S. When the reference value is 0, all the pieces of saturation data S are subjected to evaluation. According to the third embodiment of the present invention, the calculation part 31 follows the flowchart of FIG. 7 to define the reference value of saturation by the mode of saturation and determines the slanted striped pattern factor based on correlation coefficients of pixel positions where saturation is higher than the reference value.

Figure 8:
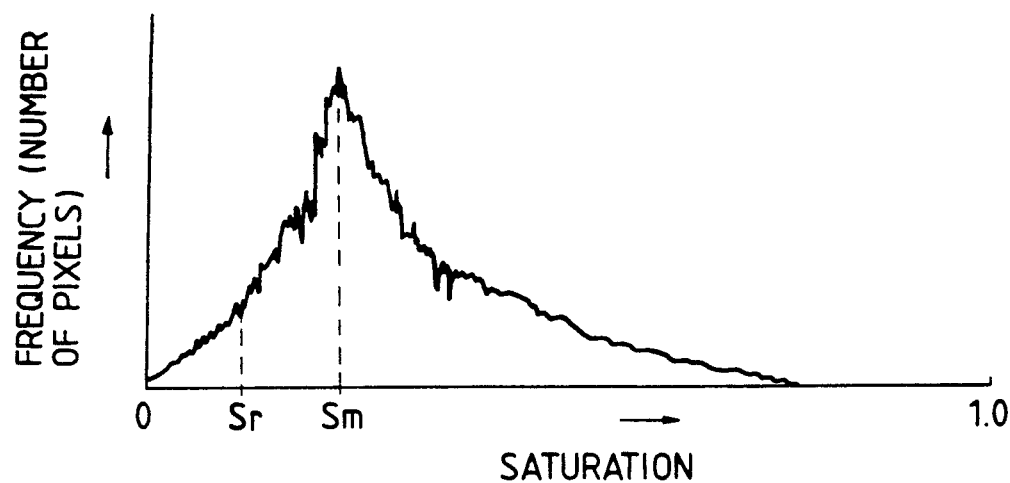
FIG. 8 is graph showing an example of a saturation histogram.

In step $S_1$ the saturation image data is read out of the saturation image memory 30S to obtain a histogram. From the histogram is obtained a mode value of saturation or the most frequent level in the histogram. FIG. 8 shows an example of the histogram of saturation image data. The histogram can be obtained by dividing the width of saturation 0 to 1.0 into, for example, 1,000 equal sections and by calculating the number of pixels in each saturation section. The center saturation in each saturation section may be used as the saturation representing the section. In this example, a saturation value Sm is shown to present the highest frequency value (which will hereinafter referred to as a mode value).

In the next step $S_2$ the mode saturation value Sm is multiplied by a predetermined ratio p to obtain the reference saturation value Sr. This example will be described with respect of the case where the predetermined ratio p is 0.5.

In step $S_3$ pixels with saturation above the reference saturation value Sr are read out from the memory 30S. Further, the hue image data H is read out from the hue image memory 30H using each of the addresses of the pixels where the saturation is above the reference saturation Sr. The color represented by the hue image data H is decided by a color deciding part 32 and a "1" is written, at the corresponding address, in that one of color matrix memories 40R to 40M which corresponds to the color identified by the color deciding part 32. At addresses corresponding to the other pixel positions "0's" are held. Consequently, "1's" are stored in each of the color matrix memories 40R to 40M at pixel positions where the saturation value is larger than the reference value Sr=0.5 Sm. The colors corresponding to the color matrix memories 40R, 40G, 40B, 40Y, 40C and 40M are red for 40R, green for 40G, blue for 40B, yellow for 40Y, cyan for 40C and magenta for 40M.

Next, in step $S_4$ a correlation coefficient r of the X and Y coordinates of pixel positions where the "1's" have been written in the color matrix memory is obtained for each color, that is, for each of the six colors in this example. The correlation coefficient r is given by the following equations:

$$r = \frac{\sigma_{xy}}{\sigma_x \cdot \sigma_y} \quad (2)$$

$$\sigma_x = \sqrt{\frac{1}{n} \sum_{i=1}^{n} (x_i - x)^2} \quad (3)$$

$$\sigma_y = \sqrt{\frac{1}{n} \sum_{i=1}^{n} (y_i - y)^2} \quad (4)$$

$$\sigma_{xy} = \frac{1}{n} \sum_{i=1}^{n} (x_i - x)(y_i - y) \quad (5)$$

Here, $(x_i, y_i)$ is the pixel position where "1" is stored, n is the number of the pixel positions, and x and y are mean values of $x_i$ and $y_i$ (where i=1, ... n).

Figure 9:
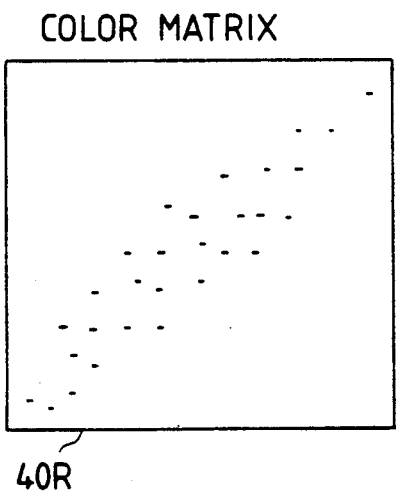
FIG. 9 is diagram of a colored pattern written on a color matrix memory when the slanted pattern factor is large.
Figure 10:
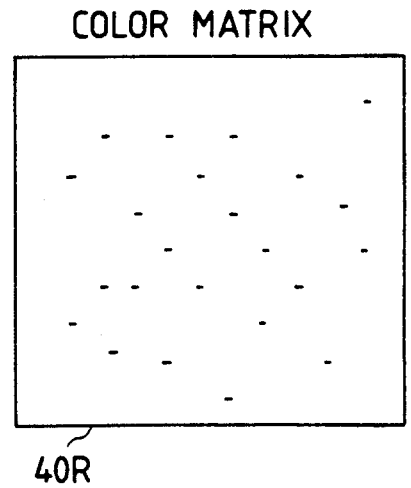
FIG. 10 is a diagram of a colored pattern written on the color matrix memory when the slanted pattern factor is small.

The absolute values of the correlation coefficients r for the six colors are obtained. The absolute values will hereinafter be represented by R. The absolute value R is large when the pixel positions where "1's" have been stored in each of the color matrix memories 40R through 40M are distributed so that they form a slanted pattern as shown in FIG. 9. On the other hand, when the pixel positions where "1's" have been stored are discrete as depicted in FIG. 10, the absolute value is small.

In step $S_5$ the number of pixels, n, where "1's" have been written in each of the color matrix memories 40R through 40M is divided by the total number, N, of pixels of one frame to normalize the pixel number n, obtaining its normalized value K=n/N. This normalization is intended to permit evaluation of colors for image sensors with different numbers of pixels.

In step $S_6$ the values R and K are obtained for each color and a slanted striped pattern factor I=R×K for each color. In the next step $S_7$ a maximum one of the slanted striped pattern factors I of the respective colors is detected and the maximum slanted striped pattern factor is provided as a representative slanted striped pattern factor Im of the color image signal. Alternatively, a mean value of the slanted striped pattern factors of all the colors may be used as the representative slanted striped pattern factor Im. The calculation part 31 outputs the representative slanted striped pattern factor Im thus defined. For example, when the representative slanted striped pattern factor Im is larger than the predetermined value, it can be determined that the image sensor under test is no good.

In its computation in step $S_6$ the slanted striped pattern factor, I=R×K, may also be weighted for each color. That is, colors can be classified into gay and quiet colors. Therefore, it is considered reasonable to employ different criteria for respective colors by multiplying the slanted striped pattern factors I of gay colors by large weighting coefficients W. The weighting coefficient W can be set, for example, to 1.0 for red R and magenta M, 0.75 for green G and yellow Y, and 0.5 for cyan C and blue B.

Thus, a maximum or mean value of the values obtained by multiplying the slanted striped pattern factors I of the respective colors by the weighting coefficients W may be defined as the representative slanted striped pattern factor Im, by which the detection sensitivity can be enhanced for the gay colors.

As described above, according to the third embodiment of the present invention, the color reproduction error which is contained in the color image signal and appears as a slanted striped pattern in the reproduced picture can be detected mechanically, not artificially. Accordingly, the color image signal from the color image sensor can be evaluated in a short time. This permits testing of a large number of color image sensors in a short time and hence saves labor. Moreover, since the evaluation does not scatter, the test can be made with high reliability.

While in the above the six colors, i.e. red, green, blue, yellow, cyan and magenta, are used, it can easily be understood that the present invention is not limited specifically to the six colors but is applicable as well to a test employing three to 12 colors including red, green and blue.

Figure 11:
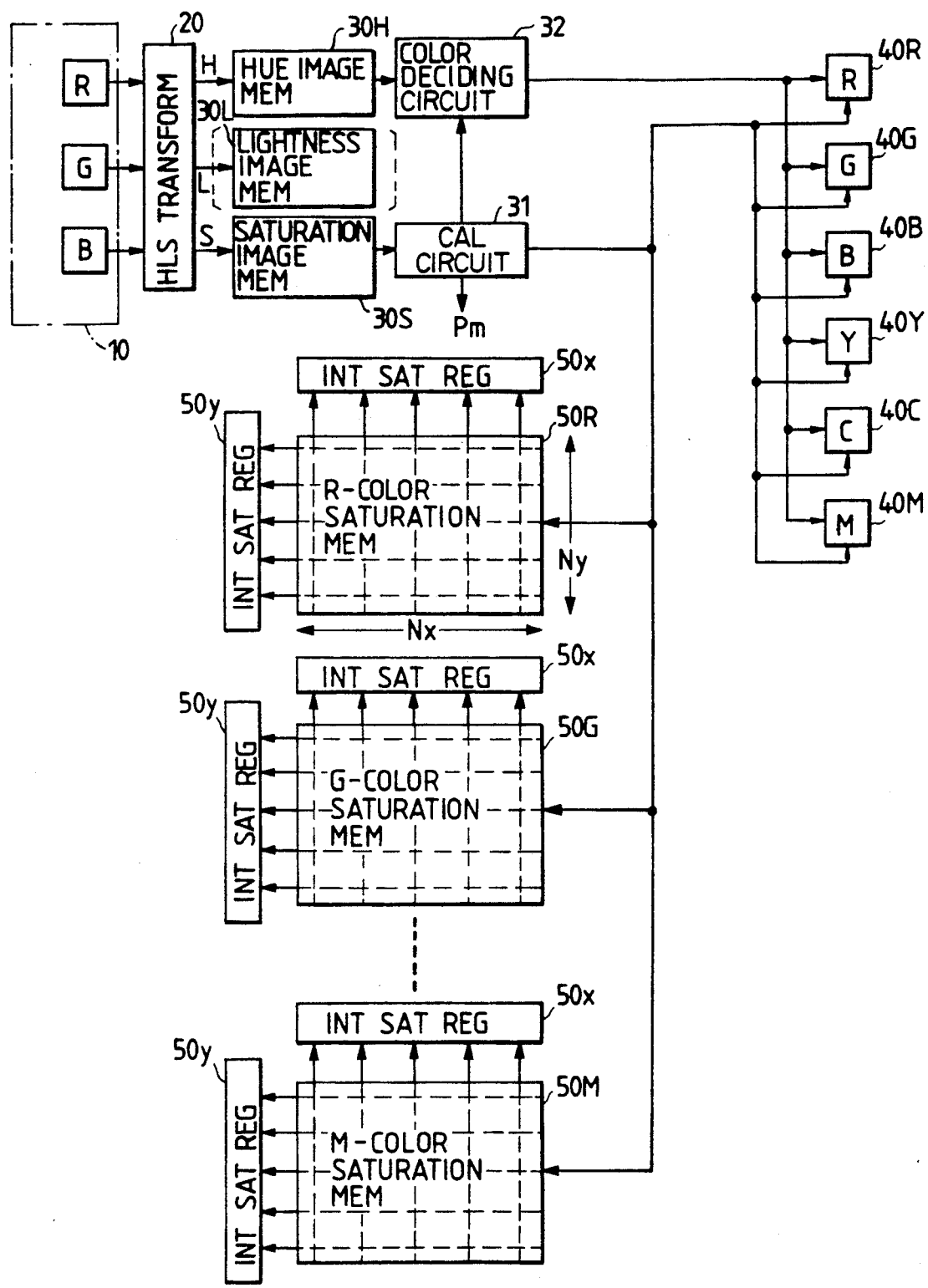
FIG. 11 is a block diagram of an apparatus for evaluating a border striped pattern factor according to a fourth embodiment of the present invention.

Next, a description will be given, with reference to FIGS. 11 through 16, of a color image signal evaluating apparatus for evaluating vertical and lateral stripes in peripheral portions of the picture through utilization of the color image signal evaluating method according to a fourth embodiment of the present invention. As shown in FIG. 11, the apparatus has an arrangement in which color saturation memories 50R to 50M corresponding to the respective colors are connected to the calculation part 31 in the apparatus depicted in FIG. 6. Also in this embodiment, for instance, standard white light with no pattern is applied all over the image receiving surface of an image sensor not shown. As is the case with FIG. 6, the red, green and blue monochromatic signals R, G and B from the color image signal source 10, which is the output of the image sensor, are transformed by the HLS transform part 20 to hue image data H, lightness image data L and saturation image data S, which are stored in the memories 30H, 30L and 30S, respectively, As in the case of FIG. 6, the saturation image data S is read out of the saturation image memory 30S to obtain a histogram of saturation, from which is obtained a mode value Sm of saturation or the most frequent level in the histogram. The mode saturation value Sm is used to determine the reference saturation Sr in the same manner as in the case of FIG. 6, and the positions or addresses of pixels where values of the saturation image data in the memory 30S are greater than the reference saturation values are provided to the color deciding part 32. The color deciding part 32 identifies the colors corresponding to those pieces of hue image data in the memory 30H which correspond to the above addresses and selects the color matrix memories 40R through 40M of the corresponding colors accordingly and writes therein a "1" at each of the corresponding addresses as in the case of FIG. 6. As a result of this, red image data based on the saturation image data having values greater than the reference saturation value Sr are stored in the memory 40R. Similar image data are stored in the memories 40G to 40M as well.

Figure 12:
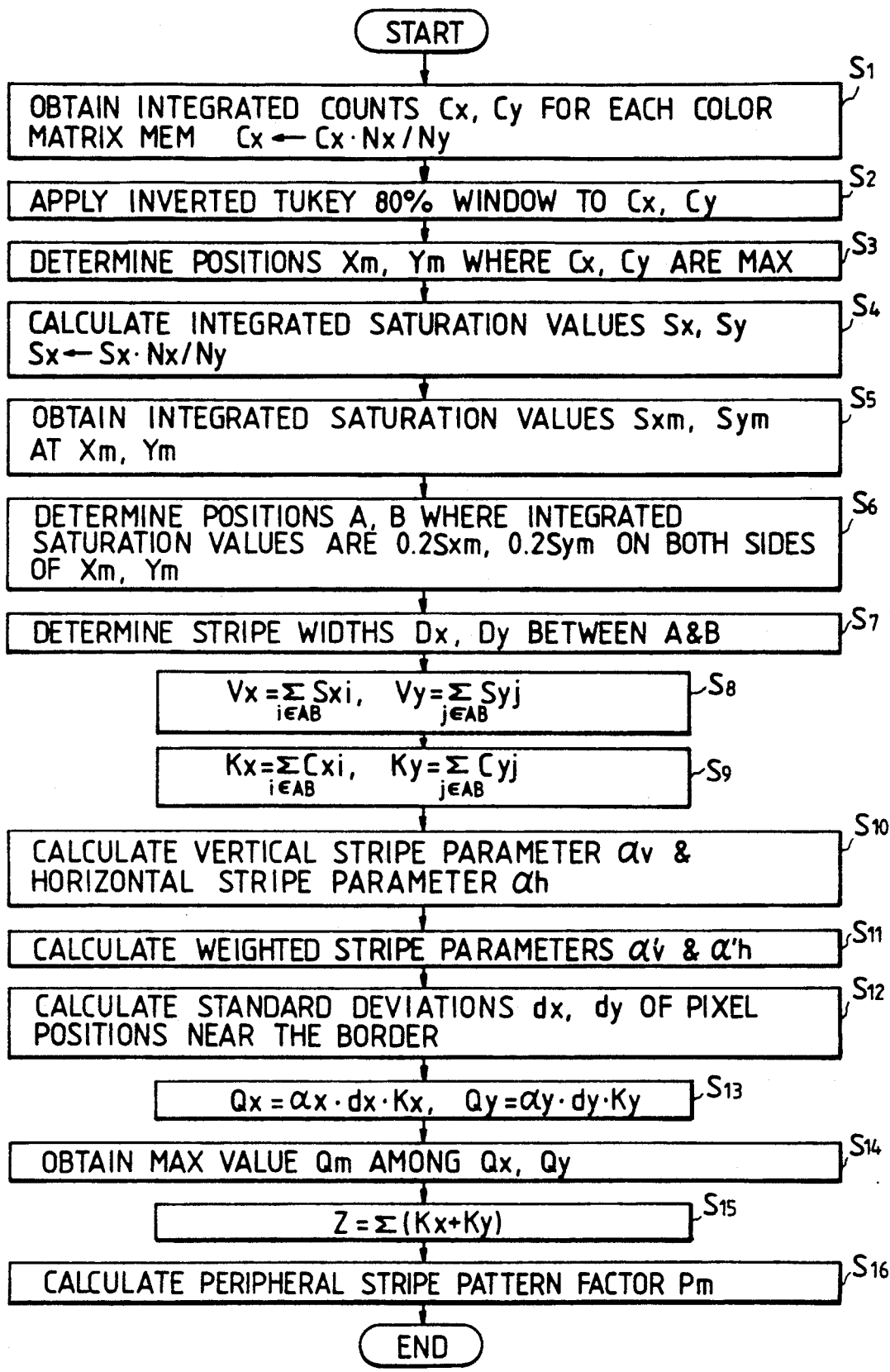
FIG. 12 is a flowchart showing a process for detecting the border striped pattern factor by the apparatus depicted in FIG. 11.
Figure 13:
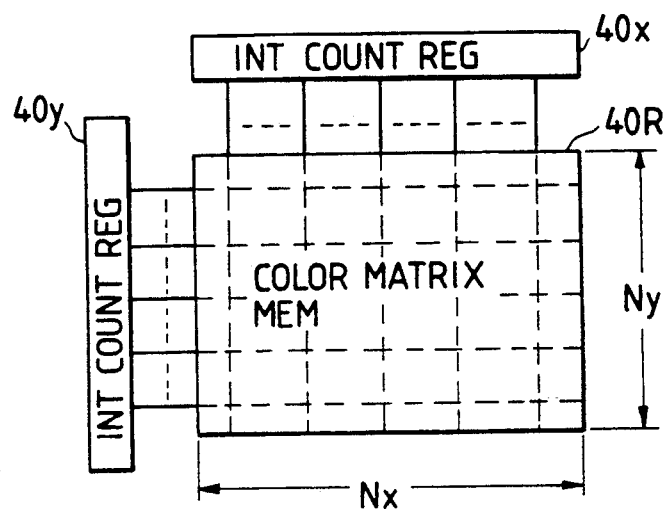
FIG. 13 is a diagram for explaining the directions in which to integrate the contents of each color matrix memory and X and Y integrated counts obtained thereby.
Figure 14:
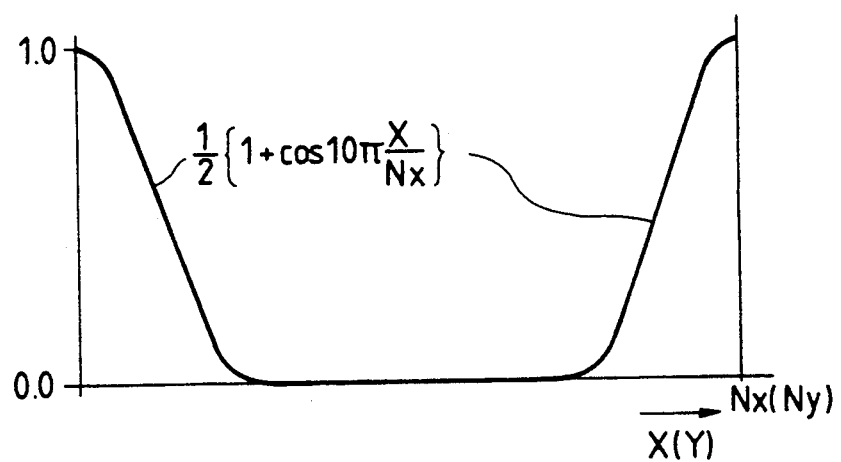
FIG. 14 is a graph showing an example of a weighting function for the integrated counts.

Moreover, the calculation part 31 performs, as shown in FIG. 12, the following process using the data stored in the saturation image memory 30S and the color matrix memories 40R through 40M.

Step $S_1$: Let the picture size be represented by the number of pixels, Nx and Ny, in the x- and y-axis directions, respectively. Accordingly, $N = Nx \times Ny$. According to the fourth embodiment of the present invention, X and Y registers 40x and 40y are provided in association with each of the color matrix memories 40R through 40M, as exemplified in FIG. 13 in which the X and Y registers 40x and 40y are shown to be provided in association with the color matrix memory 40R. The numbers of pixels each having stored therein a "1" in each column and each row of each color matrix memory are integrated, or counted in the Y and X directions, respectively, by the calculation part 31 to obtain Nx integrated values Cx and Ny integrated values Cy.

These integrated values Cx and Cy are stored in the X and Y registers 40x and 40y. These integrated values will hereinafter be referred to as integrated counts. To equalize the evaluation of a striped pattern in the X and Y directions, the Nx integrated counts Cx are each multiplied by Nx/Ny, or the Ny integrated counts Cy are each multiplied by Ny/Nx. In the following description such normalized integrated counts will be used as Cx for the X axis. The above processing is performed for each of the color matrix memories 40R through 40M.

Step $S_2$: According to the fourth embodiment of the invention, the integrated counts Cx (normalized) and Cy loaded in the X and Y registers 40x and 40y provided in association with each color matrix memory are subjected to weighting shown in FIG. 14 so as to detect and evaluate stripes in the peripheral portion of the picture. In this instance, the integrated counts at those portions of each of the registers 40x and 40y which extend from either end thereof by a length, for example, 1/10 that of each register is weighted using a portion of a cosine function called an inverted Tuckey 80% window, for example. By this weighting, detection sensitivity is provided in the peripheral portion of the picture.

Step $S_3$: The calculation part 31 detects positions Xm and Ym of maximum ones of the integrated counts Cx and Cy for each color.

Step $S_4$: According to the fourth embodiment of the invention, the saturation data corresponding to those pixel positions in each of the color matrix memories 40R to 40M at which the "1's" have been stored are read out of the saturation image memory 30S and written into each of the corresponding color saturation memories 50R to 50M at the corresponding pixel positions. X and Y registers 50x and 50y are provided in association with each of the color saturation memories 50R to 50M, and saturation values in each memory are integrated in the X and Y directions to obtain Nx integrated values Sx and Ny integrated values Sy. These integrated values will hereinafter be referred to as integrated saturation values.

The integrated saturation values Sx and Sy are stored in the X and Y registers 50x and 50y. As is the case with the afore-mentioned integrated counts Cx, the integrated saturation values Sx are normalized by multiplication with Nx/Ny. In the following description the normalized integrated saturation values are used as Sx. The above processing is performed for each of the color saturation memories 50R through 50M.

Step $S_5$: The integrated saturation values Sx and Sy corresponding to the positions Xm and Ym of the maximum integrated counts Cx and Cy in each of the color matrix memories 40R through 40M are obtained as Sxm and Sym, respectively.

Figure 15:
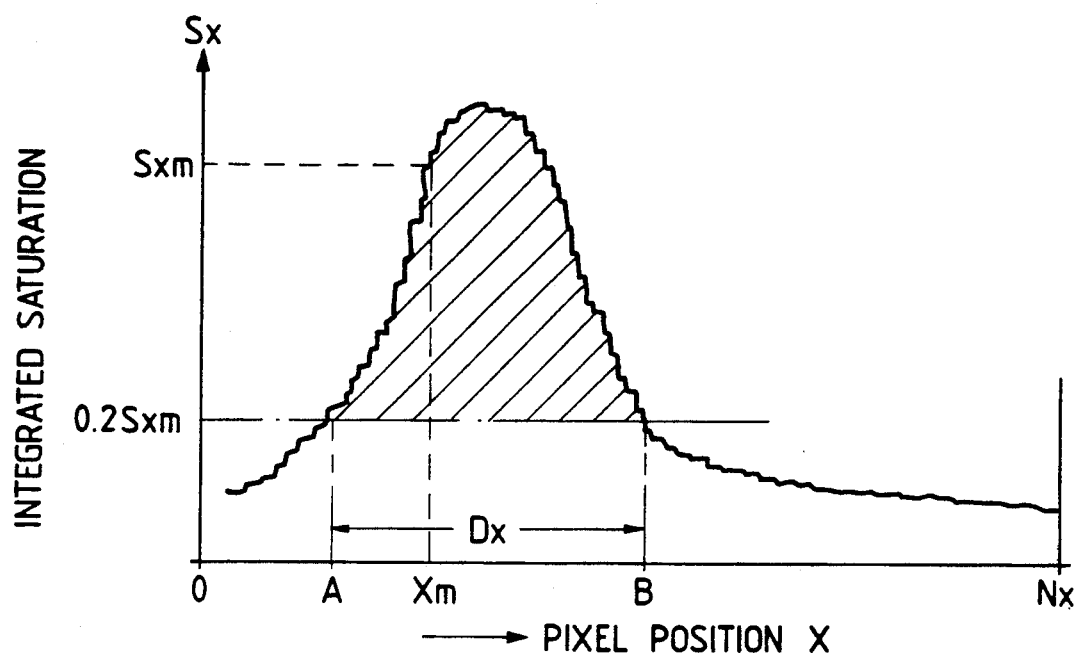
FIG. 15 is a graph showing integrated saturation and for explaining a method of defining borders A and B of a striped pattern.

Step $S_6$: For each color the positions A and B where the integrated saturation values are, for example, 0.2 times the maximum Sxm and Sym, are detected on both sides of each of the positions Xm and Ym where the integrated saturation values are Sxm and Sym. FIG. 15 exemplifies this with respect to the integrated saturation Sx in the X register 50s provided in association with one of the color, saturation memories.

If the position where the saturation value is 0.2 times the maximum value cannot be found on either one of sides of the position Xm, that is if the integrated saturation values Sx on that side are all greater than 0.2 Sxm, the end of the X register 50x on that side is regarded as the position A or B. In a similar manner, the positions A and B are defined on both sides of Ym with respect to the integrated saturation values Sy in the Y register 50y. The process of step $S_6$ is to define the positions of both ends A and B of the vertical or lateral stripe widthwise thereof.

It is preferable that prior to the detection of the positions A and B in step $S_6$ the integrated saturation values Sx and Sy held in the X and Y registers 50x and 50y be applied to a low-pass filter with a length 3 (a 3-pixel length) to reduce noise. The low-pass filter with a length 3 in the case of the X register 50x, for instance, is a low-pass characteristic which is obtained by such processing as mentioned below.

Figure 16:
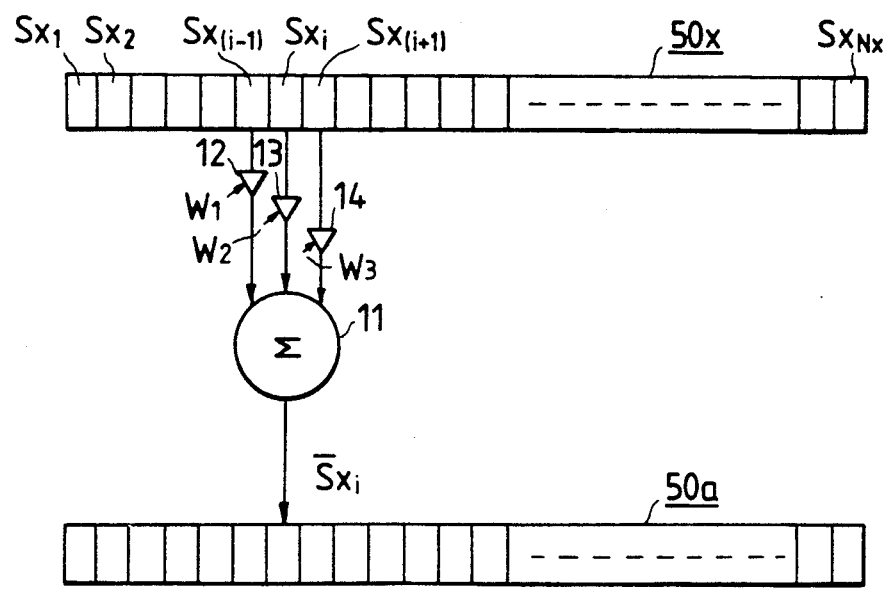
FIG. 16 is a diagram for explaining an operation for applying the integrated saturation to a low-pass filter.

That is to say, where the data loaded in the X register 50x of a certain color are arranged in the order $Sx_1$, $Sx_2$, $Sx_3$, ..., $Sx_i$, ... (where i=1, ... Nx) as shown in FIG. 16, for example, three consecutive pieces of data $Sx_{(i-1)}$, $Sxi$ and $Sx_{(i+1)}$ are respectively multiplied by weighting coefficients $W_1$, $W_2$ and $W_3$ in multipliers 12, 13 and 14 and the multiplied outputs are added together by an adder 11. For example, when the weighting coefficients $W_1$, $W_2$ and $W_3$ are 0.25, 0.5 and 0.25, the output $Sx_i$ of the adder 11 is given by the following equation:

$$Sx_i = 0.25Sx_{(i-1)} + 0.5Sxi + 0.25Sx_{(i+1)} \qquad (6)$$

The value $Sx_i$ is calculated for i=1, ..., Nx. In this case, $Sx_0 = 0$ and $Sx_{(Nx+1)} = 0$. The calculated values are sequentially held in an auxiliary register 50a. When the value $Sx_i$ is obtained in the register 50a for all i's, the register 50x is updated in accordance with the contents of the register 50a. An abrupt change in the value between the adjacent data $Sx_i$ and $Sx_{(i+1)}$ is made gentle by this filtering. The data Sy in the Y register 50y is also subjected to similar processing.

Step $S_7$: The distances Dx and Dy are determined between the two positions A and B detected in step $S_6$ for integrated saturation values Sx and Sy of each color, as shown in FIG. 15 (only in connection with Sx). That is, the widths of the vertical and lateral stripes.

Step $S_8$: The integrated saturation values Sx and Sy between the positions A and B are respectively summed up for each color. The sum values are represented by Vx and Vy. In this case, when Dx=0, then Vx=0, and when Dy=0, then Vy=0. These values are mean integrated values of saturation S of sample pixels in the stripe defined by A and B in each of the saturation memories 50R through 50M. That is, these values are the total strength of saturation of the stripes.

Step $S_9$: The integrated counts Cx and Cy between the two positions A and B are summed up for each color, obtaining sum values Kx and Ky. In this case, when Dx=0, then Kx=0 and when Dy=0, then Ky=0. These values each mean the area of the stripe defined in width by A and B.

Step $S_{10}$: Values $\alpha_v$ and $\alpha_h$, which are given by the following equations, are defined as vertical-stripe and lateral-stripe parameters, respectively.

$$\left. \begin{array}{l} \alpha_v = Vx \div Dx \div Nx \times Wx \\ \text{where: } Wx = \{0.5[1 + \cos(2\pi \cdot 2Dx/Nx)]\}^J \\ \text{for } 0 < Dx \leq Nx/4 \\ \text{and } Wx = 0 \text{ for } Dx < Nx/4 \end{array} \right\} \qquad (7)$$

$$\left. \begin{array}{l} \alpha_h = Vy \div Dy \div Ny \times Wy \\ \text{where: } Wy = \{0.5[1 + \cos(2\pi \cdot 2Dy/Ny)]\}^J \\ \text{for } 0 < Dx \leq Ny/4 \\ \text{and } Wy = 0 \text{ for } Dy < Ny/4 \end{array} \right\} \qquad (8)$$

In Eq. (7), (Vx÷Dx) represents mean integrated saturation per a column of pixels on the vertical stripe of the width Dx, and this is normalized in Eq. (7) through division by the X-direction size Nx of the display screen. The thus normalized value is weighted in Eq.(7) by a weighting function Wx which depends on Dx/Nx.

The same is true of Eq. (8). Incidentally, J is a value of approximately 5, for example.

Step $S_{11}$: Since stripes are negligible when their widths are smaller than a certain value and their colors are not vivid, the parameters of a stripe whose widths Dx and Dy are smaller than K (K=10, for example) are further weighted by the following equations:

$$\alpha'_v = \alpha_v \times \{0.5[1 - \cos(2\pi \cdot Dx.2K)]\}^L \qquad (9)$$

$$\alpha'_h = \alpha_h \times \{0.5[1 - \cos(2\pi \cdot Dy.2K)]\}^L \qquad (10)$$

In the above, L is a value of approximately 0.67, for instance. By a suitable selection of the value L, the values $\alpha'_v$ and $\alpha'_h$ can be made to approach 0 at a desired speed as the width of the stripe becomes smaller than the value K.

Step $S_{12}$: For the afore-mentioned maximum integrated count positions Xm and Ym in each of the color matrix memories 40R through 40M, standard deviations $d_x$, $d_y$ are obtained concerning the positions Xj, Yk of all pixels having stored therein "1" within the stripe width defined as mentioned previously. The standard deviations are modified ones, which are given by the following equations:

$$d_x = \sqrt{n_x} \times \sqrt{\sum_{j=1}^{n_x} (xj - Xm)^2 \cdot Sj^2} \qquad (11)$$

$$d_y = \sqrt{n_y} \times \sqrt{\sum_{k=1}^{n_y} (xk - Ym)^2 \cdot Sk^2} \qquad (12)$$

In the above, Sj and Sk are saturation values of each sample pixel at the position Xj, Yk and $n_x$ and $n_y$ are the number of sample pixels having a "1" stored therein within the stripe widths Dx and Dy.

Step $S_{13}$: For each color the following equations are calculated:

$$Qx = \alpha_x \times d_x \times Kx \qquad (13)$$

$$Qy = \alpha_y \times d_y \times Ky \qquad (14)$$

Step $S_{14}$: A maximum value, Q max of six pairs or a total of 12 calculated results obtained in step $S_{13}$ is detected.

Step $S_{15}$: Six pairs of Kx and Ky obtained in step $S_9$ are all added together to obtain Z.

Step $S_{16}$: The following equation is calculated to obtain a peripheral striped pattern factor:

$$Pm = Qmax \times Z \qquad (15)$$

The calculation part 31 outputs the peripheral striped pattern factor Pm thus calculated.

The color image signal can be evaluated based on the peripheral striped pattern factor Pm obtained as mentioned above. That is, when the value of the peripheral striped pattern factor Pm is large, it can be determined that a vertical or lateral striped pattern occurs near the border of the screen owing to the color reproduction error. Accordingly, the quality the image sensor can be checked depending on whether or not the peripheral striped pattern factor Pm is greater than a predetermined value.

As described above, according to the fourth embodiment of the present invention, it is possible to qualitatively detect a striped pattern which occur near the border of the display screen owing to the color reproduction error. This, the quality inspection can be effected with higher reliability than in the case of visual inspection. In addition the use of a computer for calculating the pattern factor permits automatic inspection, and hence achieves labor saving as well.

In the above embodiment the cosine function is used as the curve for providing the weighting function, but a polygonal line function may also be employed. It will be seen that the length of the low-pass filter is not limited specifically to "3".

Next, a description will be given, with reference to FIGS. 17 through 20, of a color image signal evaluating apparatus for evaluating vertical and lateral stripes near the center of the display screen through utilization of the color image signal evaluating method according to a fifth embodiment of the present invention. The apparatus of this embodiment is basically identical in construction with the apparatus of FIG. 11 except the provision of a histogram flattening part 33. Also in this evaluation method, an image sensor (not shown) is irradiated all over its image receiving surface with, for example, standard white light, and its output R, G and B signals are used as the R, G and B monochromatic signals which are provided from the signal source 10 in FIG. 17.

This embodiment is common to the third and fourth embodiments in which a "1" is written into each of the color matrix memories 40S to 40M at the pixel positions corresponding to those in the corresponding saturation memory at which the saturation value is greater than the reference saturation value.

According to the fifth embodiment of the invention, the saturation histogram obtained in the calculation part 1 is provided to the histogram flattening part 33, wherein it is flattened. What is intended to mean by "histogram flattening" is to make the mean number of pixels per unit saturation constant over the entire area of the display screen. The histogram flattening emphasizes the contrast among colors in terms of their vividness.

Figure 18:
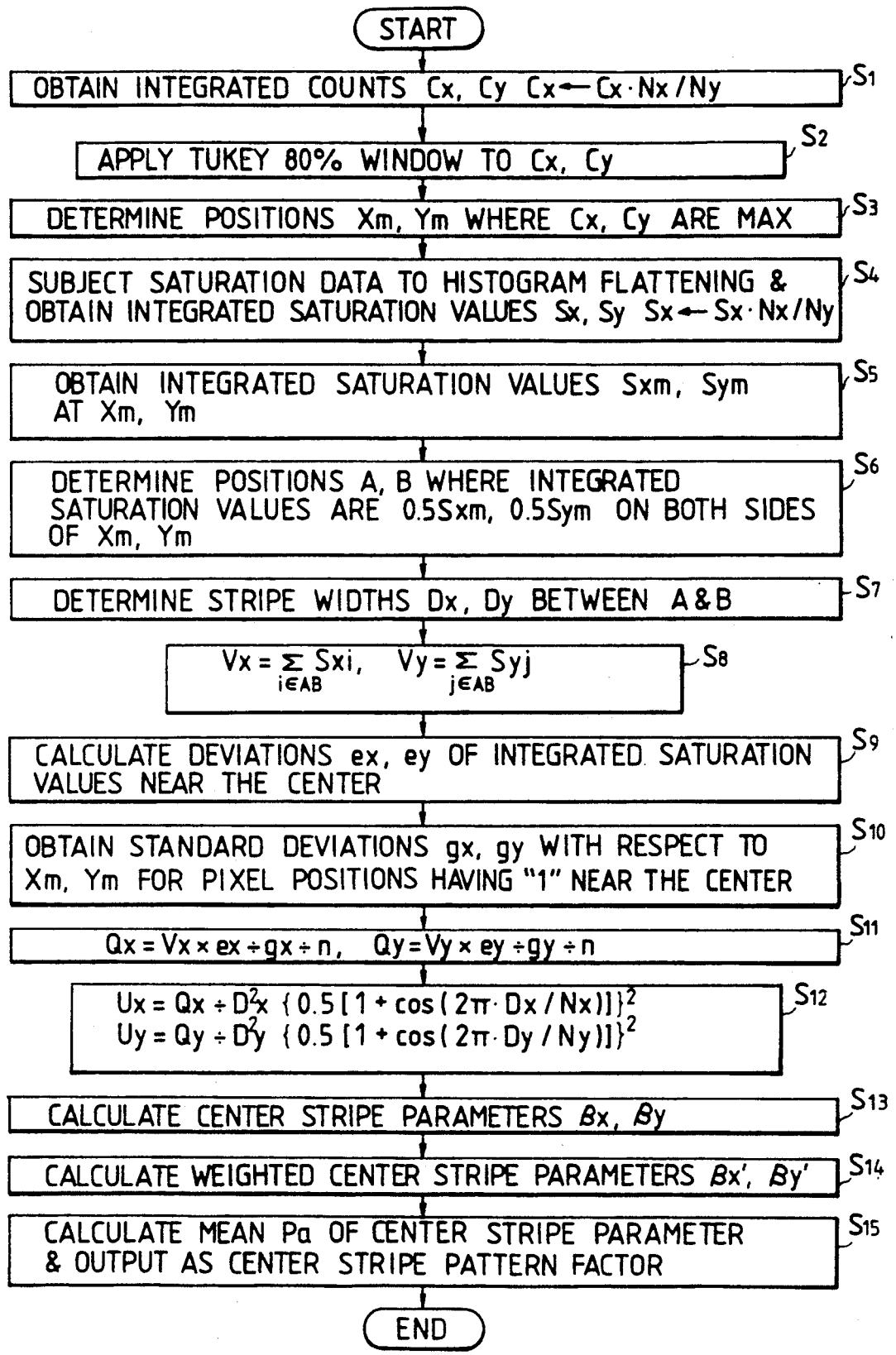
FIG. 18 is a flowchart showing a process for detecting the center striped pattern factor by the apparatus depicted in FIG. 17.
Figure 19:
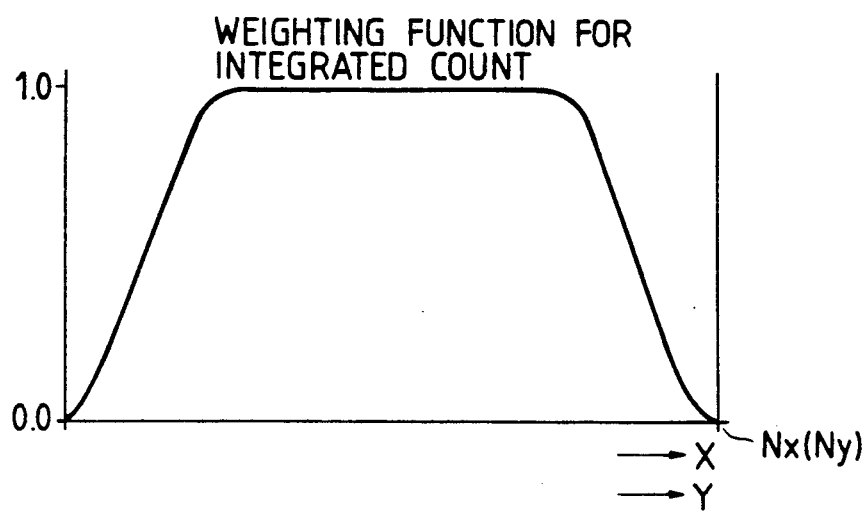
FIG. 19 is a graph of an example of a weighting function for the integrated counts.
Figure 20:
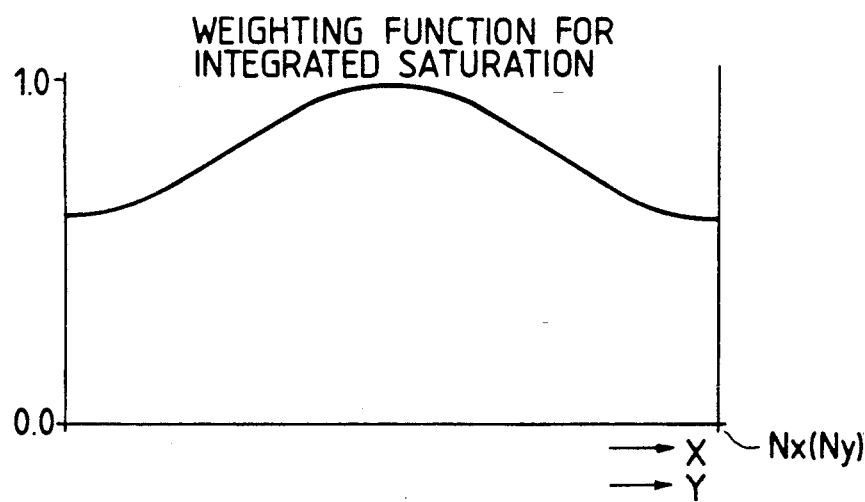
FIG. 20 is a graph of an example of a weighting function for the integrated saturation.

The saturation image data emphasized in the histogram flattening part 33 is written into each of the color saturation memories 50R through 50M as in the case of FIG. 11. Referring now to FIG. 18, the subsequent process by the calculation part 31 will be described.

Step $S_1$: The integrated counts Cx and Cy obtained in the same manner as described previously in connection with FIG. 11 are loaded into the registers 40x and 40y similar to those shown in FIG. 13. This embodiment is also common to the fourth embodiment in that the integrated count is normalized through multiplication by the image size ratio Nx/Ny to thereby eliminate the influence of different image sizes in the X and Y directions.

Step $S_2$: According to the fifth embodiment of the invention, in order to detect and evaluated a striped pattern in the center of the display screen, the integrated counts Cx and Cy loaded in the X and Y registers 40x and 40y each of the color matrix memories 40R to 40M (see FIG. 13) are subjected to weighting depicted in FIG. 19. In this instance, the integrated counts at those portions of each of the registers 40x and 40y which extend from either end thereof by a length of, for example, 1/10 that of each register is weighted by a portion of a cosine function called a Turkey 80% window, for instance. This weighting provides detection sensitivity in the center of the display screen.

Step $S_3$: The positions Xm and Ym of the maximum ones of the integrated counts Cx and Cy are detected for each of the color matrix memories 40R through 40M.

Step $S_4$: The saturation values stored in each of the color saturation memories 50R through 50M after being subjected to the histogram flattening are integrated in the Y and X directions, and the integrated saturation values Sx and Sy are stored in the registers 50x and 50y provided in association with each color saturation memory. As in the case of FIG. 12, the integrated saturation value Sx stored in the register 50x in multiplied by the ratio Nx/Ny, whereby it is normalized for eliminating the influence of the size of the screen.

Step $S_5$: As in step $S_5$ of the flowchart shown in FIG. 12, the integrated saturation values Sx and Sy corresponding to the positions Xm and Ym of the maximum ones of the integrated counts Cx and Cy in the registers 40x and 40y for each of the color matrix memories 40R to 40M are obtained as Sxm and Sym, respectively. In this instance, the integrated saturation value of each color in each direction is subjected to weighting shown FIG. 20. The curve for this weighting is a modified form of a cosine function which uses, as one cycle thereof, the lengths of each color saturation memory in the X and Y directions, i.e., the sizes Nx and Ny of the display screen in the X and Y directions.

The integrated saturation values Sx and Sy stored in the registers 50x and 50y of each color are provided to the low-pass filter having a length of, for example, 3 to reduce noise as described previously in connection with FIG. 16.

Step $S_6$: As in step $S_6$ of the flowchart shown in FIG. 12, the positions A and B where the integrated saturation values are, for example, 0.5 times the maximum, Sxm and Sym are detected on both sides of the positions Xm and Ym where the integrated saturation values are Sxm and Sym (see FIG. 15). Where such a position is not found on either one of sides of the positions Xm and Ym, that is, where the integrated saturation values Sx and Sy are all greater than 0.5 Sxm and 0.5 Sym on that side, ends of the registers 50x and 50y on that side are regarded as the positions A or B.

Step $S_7$: For each color the distance between the positions A and B, that is, the widths of the vertical and lateral stripes, Dx and Dy, are obtained.

Step $S_8$: The integrated saturation values Sx and Sy between the positions A and B are respectively summed up for each color to obtain values Vx and Vy. In... this case, when Dx=0, then Vx=0 and when Dy=0, then Vy=0.

Step $S_9$: Mean values SX and Sy of the integrated saturation values Sx and Sy in the registers 50x and 50y are obtained for each color. Standard deviations of the integrated saturation data for the mean integrated saturated values are obtained by the following equations for integrated saturation data Sxh and Syi stored in the registers 50x and 50y within the ranges between (Nx/8)+1 to 7Nx/8 and between (Ny/8)+1 to 7Ny/8 except both end portions, for example, ¾ the entire lengths of the registers.

$$e_x = \sqrt{\Sigma(Sxh - Sx)^2} \qquad (16)$$

-continued $$e_y = \sqrt{\Sigma(Sti - Sy)^2} \quad (17)$$

Step $S_{10}$: Modified standard deviations $g_x$ and $g_y$ of the pixel positions relative to the maximum integrated count positions Xm and Ym corresponding to each of the color matrix memories 40R through 40M are obtained, by the following equations, for all pixels (the number of which is represented by n) having "1" within the central area of the color matrix memory except its marginal portions on all sides by a width equal to 1/16 its length. The numbers of sample pixels in this case are represented by Nx and Ny.

$$g_x = \sqrt{\sum_{j=1}^{n}(Xj - Xm)^2/Sj^2} \quad (18)$$

$$g_y = \sqrt{\sum_{k=1}^{n}(Yk - Ym)^2/Sk^2} \quad (19)$$

Step $S_{11}$: The following equations are calculated:

$$Qx = Vx \times e_x + g_x + n \quad (20)$$

$$Qy = Vy \times e_y + g_y + n \quad (21)$$

Step $S_{12}$: The following equations are calculated:

$$Ux = Qx + Dx^2 \times \{0.5[1 + \cos(2\pi \cdot Dx/Nx)]\}^2 \quad (22)$$

$$Uy = Qy + Dy^2 \times \{0.5[1 + \cos(2\pi \cdot Dy/Ny)]\}^2 \quad (22)$$

Step $S_{13}$: For example, if $n < 2000$, then the following center stripe parameters are calculated:

$$\beta_x = Ux \times \{0.5[1 - \cos(\pi \cdot n/2000)]\}^J \quad (24)$$

$$\beta_y = Uy \times \{0.5[1 - \cos(\pi \cdot n/2000)]\}^J \quad (25)$$

In the above, J can be set to 3.67, for example.

Step $S_{14}$: Further, if the widths of the stripe, DX, Dy, are Smaller than K (where k=10, for example) as in step $S_{11}$ of the flowchart shown in FIG. 12, then the center stripe parameters are weighted as follows:

$$\beta'_x = \beta_x \times \{0.5[1 - \cos(2\pi \cdot Dx/2K)]\}^L \quad (26)$$

$$\beta'_y = \beta_y \times \{0.5[1 - \cos(2\pi \cdot Dy/2K)]\}^L \quad (27)$$

In the above, L is 6.6, for instance.

Step $S_{15}$: By the above-described processing a total of 12 pairs of data, $\beta_x$ and $\beta_y$, or $\beta'_x$ and $\beta'_y$, are obtained. A mean value Pa of these 12 pieces of data is used as the center stripe pattern factor. the calculation part 31 outputs the thus calculated center stripe pattern factor Pa.

As described above, according to the fifth embodiment of the invention, the striped pattern factor can be obtained quantitatively. Accordingly, the quality of color image sensors can mechanically be checked and products of uniform characteristics can be obtained. Moreover, this method does not call for any manual operation, and hence is labor-saving and affords reduction of the manufacturing costs of image sensors.

In the above embodiment the low-pass filter with a length 3 is employed, but the length can be selected suitably. Further, a portion of the cosine function is used as the weighting function, but a polygonal line function or similar one can be used.

As described above, the color image signal evaluating methods according to the first through fifth embodiments of the present invention individually evaluated color image signals based on different kinds of color reproduction errors. Accordingly, checking of color image sensors for all kinds of color reproduction errors is time-consuming and a comprehensive evaluation cannot be achieved.

The color image signal evaluation apparatus according to a sixth embodiment of the present invention, described below, permits a comprehensive check of the device under test in a short time by making all the tests at one time.

Figure 21:
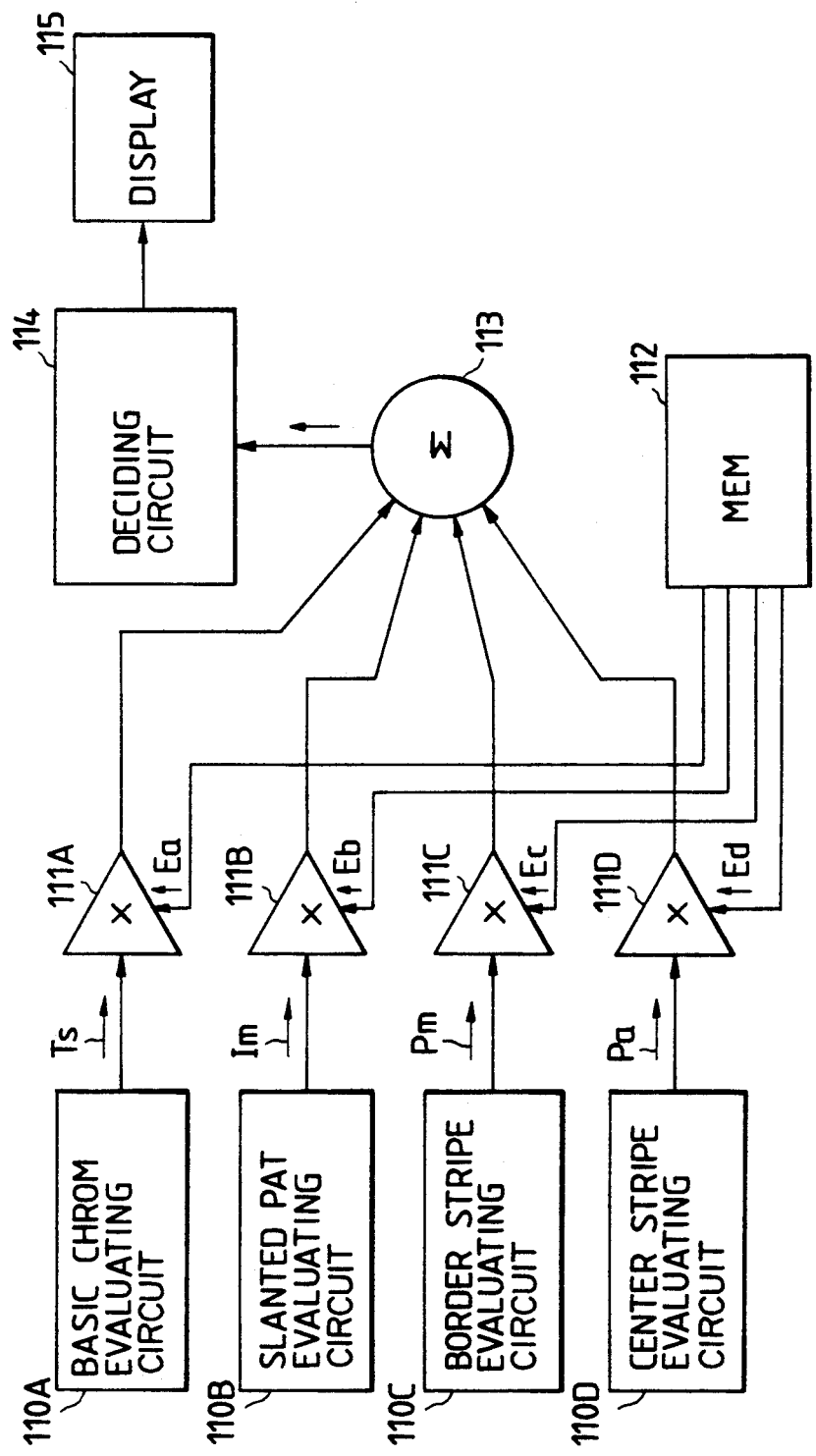
FIG. 21 is a block diagram of a general color reproduction error evaluating apparatus according to a sixth embodiment of the present invention.

FIG. 21 is an embodiment of a comprehensive color image signal evaluation apparatus according to the sixth embodiment of the invention. Reference numerals 110A, 110B, 110C and 110D indicate units for different kinds of color reproduction errors. These color reproduction error evaluating units are those shown in FIGS. 1, 6, 11 and 17, respectively, and they output the basic chromaticity Ts, the slanted stripe pattern factor Im, the border stripe pattern factor Pm and the center stripe pattern factor Pa.

The evaluated output data Ts, Im, Pm and Pa are provided to multipliers 111A through 111D, wherein they are multiplied by coefficients Ea, Eb, Ec and Ed prestored in a memory 112, and the multiplied outputs are applied to an adder 113.

The adder calculates the sum total $\Omega$ of the multiplied outputs by $$\Omega = Ea \times Ts + Eb \times Im + Ec \times Pm + Ed \times Pa \quad (28)$$

The sum total $\Omega$ is provided to a deciding part 114, wherein it is compared with a reference value for deciding whether the device under test is good or no good. The result of the decision is displayed on a display 115. The signal representing the decided result can also be used for automatically classifying, for example, color image sensors according to the decision.

The coefficients Ea, Eb, Ec and Ed prestored in the memory 112 can be experimentally obtained in advance. By combinations of these coefficients different kinds of color image sensors, for example, can be evaluated. The coefficients Ea, Eb, Ec and Ed can be set, for instance, as follow: Ea=1.0, Eb=0.1, Ec=2.0 and Ed=−1.5.

The color reproduction error evaluating units are not limited specifically to the afore-mentioned units. Of course, other kinds of color reproduction error evaluating units may also be provided.

Although the color reproduction error evaluating units 110A through 110D in FIG. 21 are described to correspond to those depicted in FIGS. 1, 6, 11 and 17, respectively, these units 110A through 110D have some common constituent elements, as will be seen from FIGS. 1, 6, 11 and 17.

Figure 22:
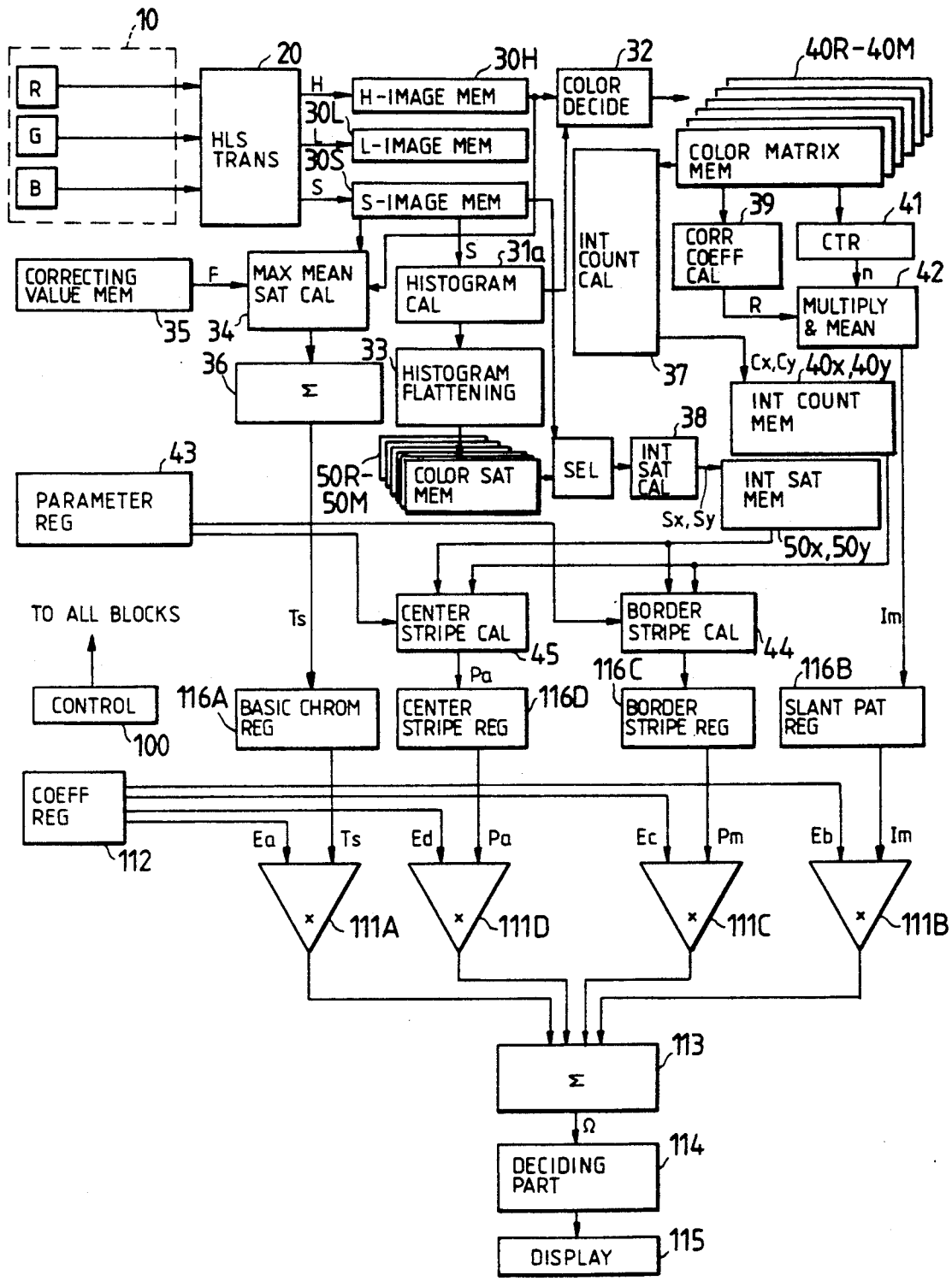
FIG. 22 is a block diagram of another example of the general color reproduction error evaluating apparatus.

FIG. 22 is a functional block diagram of a comprehensive color image signal evaluating apparatus constructed to share the same constituent elements as those in FIGS. 1, 6, 11 and 17.

The image signal source 10, the HLS transform part 20, the hue image memory 30H, the saturation image memory 30S, color matrix memories 40R to 40M, the histogram calculation part 31a, and the color saturation memories 50R to 50M are used in common to all or some of the different kinds of color reproduction error evaluation.

In the evaluation of the basic chromaticity according to the first embodiment of the invention, the saturation data S is read out of the saturation image memory 30S for each predetermined block size and in a maximum mean saturation calculation part 34 the mean value of the saturation in each block is calculated, (step $S_2$ in FIG. 2), a maximum one of the mean saturation values is found (step $S_4$), and each time the block size is changed under control of a control part 100, the maximum mean saturation value is accumulated in an adding part 36 to obtain the basic chromaticity Ts, which is held in a basic chromaticity register 116A.

In the evaluation of the basic chromaticity Ts according to the second embodiment of the invention, prior to the calculation of the mean saturation value according to the first embodiment of the invention, the maximum mean saturation calculation part 34 reads out the hue image data H of the corresponding block in the hue image memory 30H, then reads out the correction value F corresponding to the hue image data H from a correction value memory 35 having prestored therein such a hue sensitivity characteristic as shown in FIG. 5, and corrects the corresponding saturation by the correction value F (step $S_{23}$ in FIG. 4), thereafter calculating the mean saturation.

Figure 7:
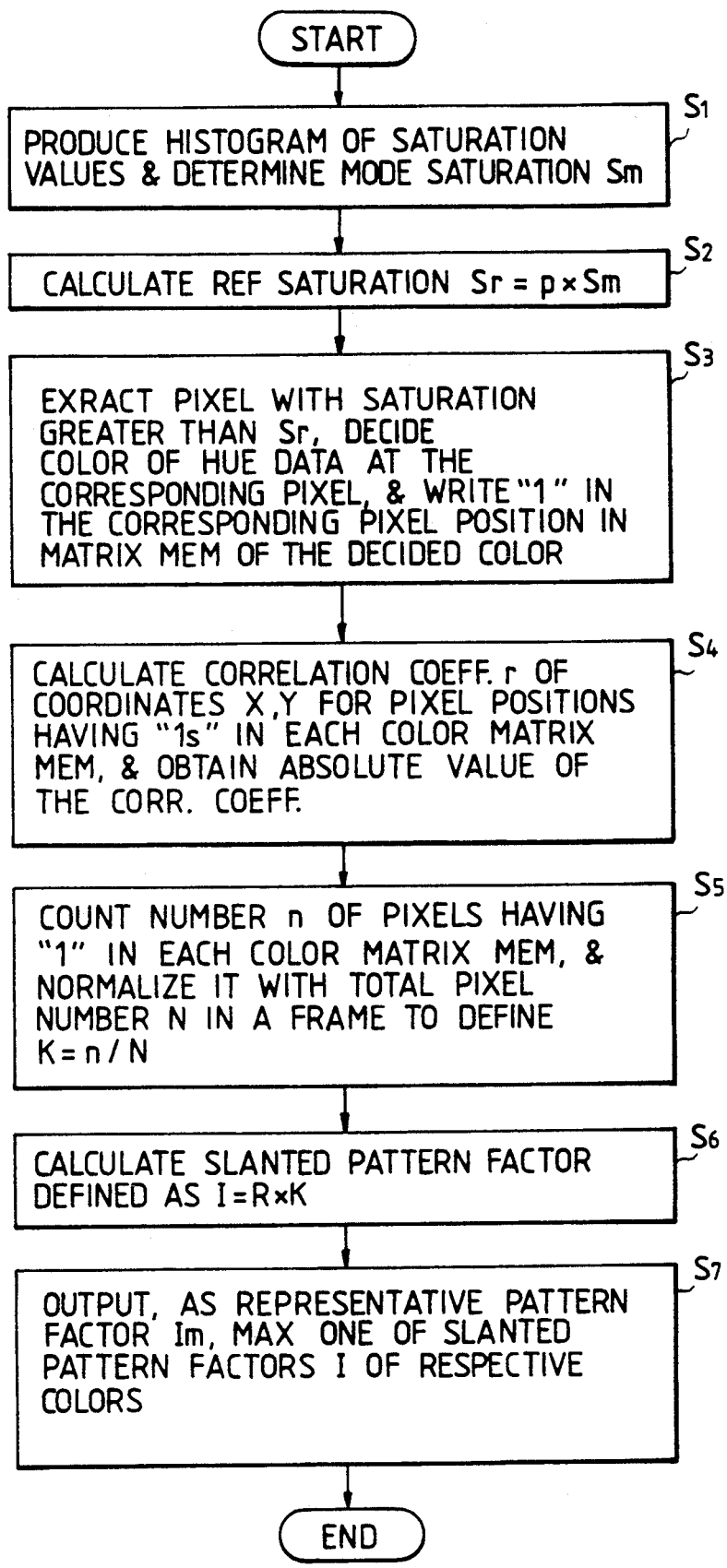
FIG. 7 is flowchart showing a process for detecting the slanted pattern factor by the apparatus depicted in FIG. 6.

In the evaluation of the slanted stripe pattern factor Im according to the third embodiment of the invention, the correlation coefficient r of the pixel positions where "1" is stored in each of the color matrix memories 40R to 40M is calculated by a correlation coefficient calculation part 39 (step $S_4$ in FIG. 7). The number of pixels, n, where "1" is stored is calculated by a pixel counter 41 (step $S_5$), the slanted stripe pattern factor I for each color is calculated by a multiply and mean part 42 based on the correlation coefficient r and the number of pixels n (step $S_6$). In this embodiment the mean value of such slanted stripe pattern factors is output as the slanted stripe pattern factor Im and is held in a slanted pattern factor register 116B.

In the evaluation of the border stripe pattern factor Pm according to the fourth embodiment of the invention, the stored contents of each of the color matrix memories 40R to 40M and each of the color saturation memories 40R to 50M are integrated by an integrated count calculation part 37 and an integrated saturation value calculation part 38 in the X and Y directions to obtain the integrated counts Cx and Cy and the integrated saturation values Sx and Sy, which are stored in each of the integrated count memories 40x and 40y and the integrated saturation memories 50x and 50y.

A border stripe pattern factor calculation part 44 determines the positions Xm and Ym of the maximum ones of the integrated counts Cx and Cy (step $S_3$ in FIG. 12), defines the borders A and B of the striped pattern on both sides of the integrated saturation values Sxm and Sym of the positions Xm and Ym (step $S_6$), and calculates the integrated saturation summed values Vx and Vy (step $S_8$) and the integrated count summed values Kx and Ky (step $S_9$) within the areas defined by the borders A and B. Further, the calculation part 44 calculates the stripe parameters $a_v$ and $a_h$ from the values Vx and Vy (step $S_{10}$) and then calculates the standard deviations $d_x$ and $c_y$ of pixel positions having "1" near the border step $S_{12}$). The calculated results are held in a border stripe pattern factor register 116C. Incidentally, the sensitivity constant 0.2 for defining the borders A and B of the striped pattern in step $S_6$ and the constant J for calculating the parameters $a_v$ and $a_h$ by Eqs. (7) and (8) in step $S_{10}$ are prestored in a parameter register 43.

In the evaluation of the center stripe pattern factor Pm according to the fifth embodiment of the invention, the saturation is stored in each of the color saturation memories 50R through 50M after being emphasized in the histogram flattening part 33 (step $S_4$ in FIG. 18). A center stripe pattern factor calculation part 45 defines the borders A and B of the striped pattern and calculates the integrated saturation summed values Vx and Vy in the area defined by the borders A and B as in the case of the evaluation of the border stripe pattern factor mentioned above. Further, the calculation part 45 calculates the deviations $e_x$ and $e_y$ of the integrated saturation values in the center (step $S_9$) and then calculates the standard deviations $g_x$ and $g_y$ of pixel positions having "1" relative to the positions Xm and Ym in each matrix memory except its marginal portions (step $S_{10}$). The calculation part 45 calculates the center stripe pattern parameters $\beta_x$ and $\beta_y$ from the results of the above calculations and outputs the mean value of the parameters as the center stripe pattern factor Pa, which is held in the center stripe pattern factor register 116D.

The data Ts, Im, Pm and Pa stored in the registers 116A to 116D are provided to the multipliers 111A to 111D, respectively, wherein they are multiplied by the coefficients Ea, Eb, Ec and Ed read out of the coefficient memory 112. These multiplied results are added together by the adder 113. The added output $\Omega$ is compared with a predetermined reference value in the deciding part 114. When the former is greater than the latter, it is decided that the color reproduction error contained in the color image signal is too large, i.e., that the image sensor under test is no good. When the added output is smaller than the reference value, the image sensor is decided to be good. The decision is displayed on the display 115.

Figure 17:
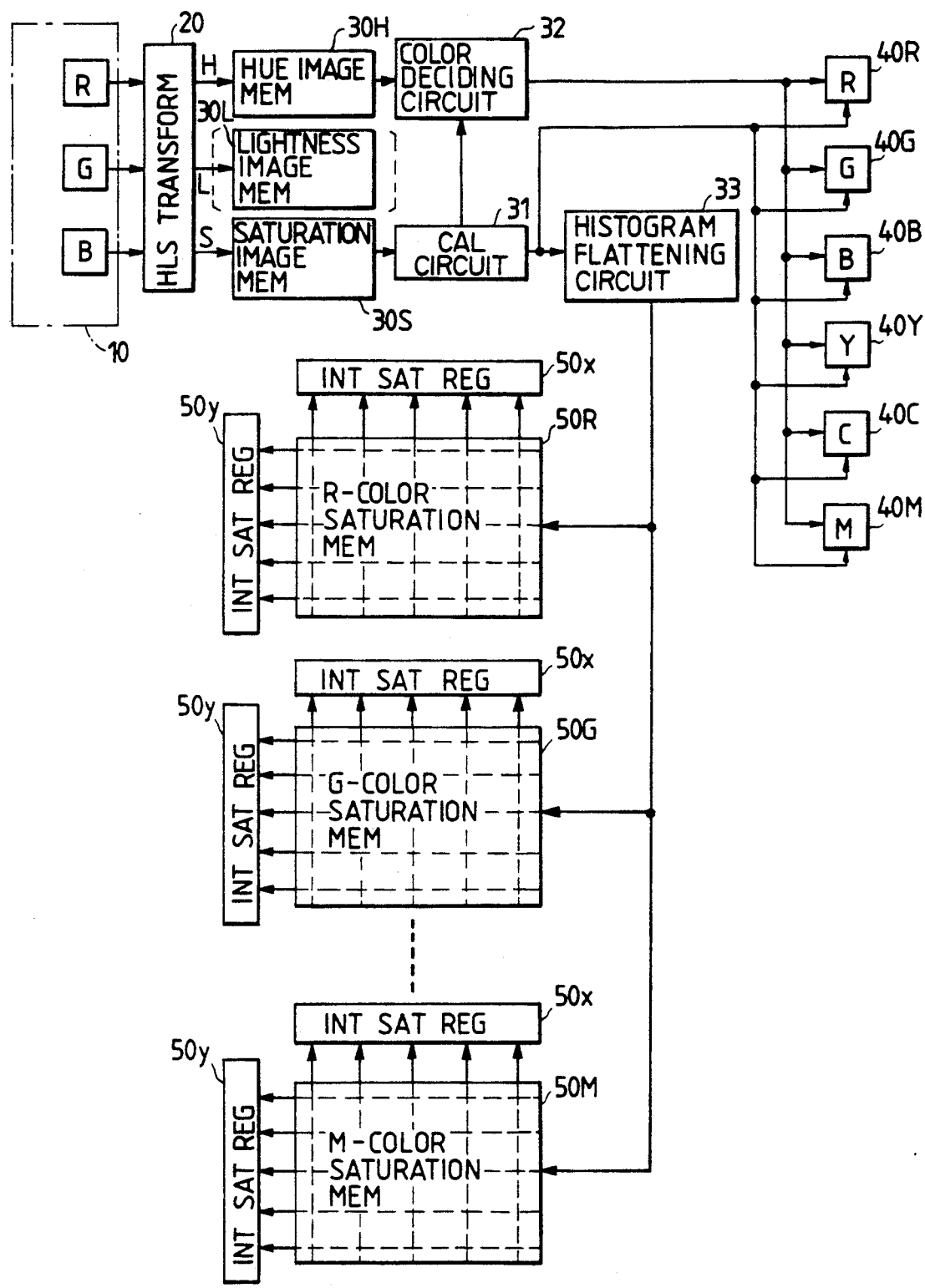
FIG. 17 is a block diagram of an apparatus for evaluating a center striped pattern factor according to a fifth embodiment of the present invention.

While in FIGS. 6, 11 and 17 the calculation part 31 and the color deciding part 32 are shown as different blocks, the calculation part 31 may be constructed to perform the function of the color deciding part 32 as well. That is, in the apparatus shown in FIG. 22 the data processing in and after the HLS transform part 20 can be executed by a computer, but a desired processing feature can also be constructed by dedicated hardware so as to speed up the data processing.

As described above, according to the sixth aspect of the present invention, different kinds of color reproduction errors are detected in numerical form by the color reproduction error evaluating units 110A to 110D, the numerical values of the color reproduction errors thus detected are summed up after being multiplied by coefficients for normalization, and the color image signal is decided to be good or no good, depending on whether the sum $\Omega$ is greater than a predetermined value. Hence, a comprehensive check of the color image signal can be made by the apparatus of this embodiment. For example, when employed for the test of color image sensors, the evaluating apparatus permits testing of various kinds of color reproduction errors at one time with high accuracy and in a short time.

Furthermore, many kinds of color image sensors can be tested with high accuracy when coefficients to be prestored in the memory 112 for each kind of image sensor are prepared.

It will be apparent that many modifications and variations may be effected without departing from the scope of the novel concepts of the present invention.

What is claimed is:

1. A color image signal evaluating apparatus comprising:
   color image signal transform means for transforming a color image signal to saturation image data;
   a saturation image memory, operatively connected to said color image signal transform means, for storing at least one frame of said saturation image data provided from said color image signal transform means; and
   calculating means for averaging said saturation image data read out of said saturation image memory for each pixel block of predetermined size to obtain means saturation values, determining a maximum one of said means saturation values, calculating a sum total of said maximum mean saturation values obtained for each of a predetermined number of pixel block sizes, and outputting a value corresponding to said sum total as basic chromaticity.

2. A color image signal evaluating apparatus comprising:
   color image signal transform means for transforming a color image signal to hue image data and saturation image data;
   a hue image memory, operatively connected to said color image signal transform means, for storing at least one frame of said hue image data provided from said color image signal transform means;
   a saturation image memory, operatively connected to said color image signal transform means, for storing at least one frame of said saturation image data provided from said color image signal transform means; and
   calculating means for dividing said saturation image data of one frame in said saturation image memory into pixel blocks of a predetermined size, for correcting said saturation image data in each of said pixel blocks based on said hue image data in said hue image memory corresponding to said each pixel block, for averaging said corrected saturation image data in said each pixel block to obtain a mean saturation value, for determining a maximum one of said mean saturation values obtained for one frame, for calculating a sum total of said maximum means saturation values obtained for each of a predetermined number of pixel block sizes, and for outputting a value corresponding to said sum total as basic chromaticity.

3. A color image signal evaluating apparatus according to claim 2, wherein said calculating means includes means whereby said saturation image data of each pixel in said each pixel block, read out of said saturation image memory, is corrected based on said hue image data read out of the corresponding pixel position in said hue image memory.

4. A color image signal evaluating apparatus comprising:
   color image signal transform means for transforming a color image signal to hue image data and saturation image data;
   a hue image memory, operatively connected to said color image signal transform means, for storing at least one frame of said hue image data provided from said color image signal a saturation image memory, operatively connected to said color image signal transform means, for storing at least one frame of said saturation image data provided from said color image signal transform means;
   color matrix memories each provided corresponding to one of a plurality of predetermined corresponding to one of a plurality of predetermined colors and having storage positions corresponding to pixel positions of one frame; and
   calculating means for reading out and comparing said saturation image data corresponding to each pixel position with a reference saturation value, for identifying the color which is represented by said hue image data corresponding to the pixel position having a saturation value greater than said reference saturation value and read out of said hue image memory, for writing a "1" in the corresponding pixel position in one of said color matrix memories corresponding to said identified color, for calculating a correlation coefficient for X and Y coordinates of said pixel positions having written therein said "1" in said each color matrix memory, and for outputting a value corresponding to said correlation coefficient as a slanted stripe pattern factor.

5. A color image signal evaluating apparatus according to claim 4, wherein said calculating means includes means whereby a histogram of said saturation image data read out of said saturation image memory is produced to determine a mode saturation value and said reference saturation value is determined corresponding to said mode saturation value.

6. A color image signal evaluating apparatus comprising:
   color image signal transform means for transforming a color image signal to hue image data and saturation image data;
   a hue image memory, operatively connected to said color image signal transform means, for storing at least one frame of said saturation image data provided from said color image signal transform means;
   a saturation image memory, operatively connected to said color image signal transform means, for storing at least one frame of said saturation image data provided from said color image signal transform means;
   color matrix memories each provided corresponding to one of a plurality of predetermined colors and having a storage area corresponding to pixel positions of one frame;
   color saturation memories each provided corresponding to one of said plurality of colors and having storage positions corresponding to said pixel positions of one frame; and
   calculating means for reading out and comparing said saturation image data corresponding to each pixel position with a reference saturation value, for identifying the color which is represented by said hue image data corresponding to the pixel position having a saturation value greater than said reference saturation value and read out of said hue image memory, for writing a "1" in the corresponding pixel position in one of said color matrix memories corresponding to said color identified, for writing said saturation image data in the corresponding pixel position in one of said color saturation memories corresponding to said identified color, for integrating stored contents of each of said color matrix memories in X and Y directions to obtain X and Y integrated counts, for weighting said X and Y integrated counts by a predetermined window function which becomes large near a border of a display screen, for integrating the contents of each of said color saturation memories in the X and Y directions to obtain X and Y integrated saturation values, for comparing said X and Y integrated saturation values with a reference integrated saturation value, for defining widths of said X and Y integrated saturation values which are greater than said reference integrated saturation value as the widths of vertical and lateral striped patterns of the corresponding color, for calculating the sum of the saturation values of pixels in each of said striped patterns, for calculating a standard deviation of the pixel positions having written therein said "1" and weighted by the corresponding saturation values of the corresponding color, for calculating a sum total of said X integrated counts and the sum total of said Y integrated counts in each of said striped patterns, for multiplying said sum of saturation values, said standard deviation and said sum of integrated counts for said vertical and lateral striped patterns, and for outputting a value corresponding to the multiplied result as a border striped pattern factor.

7. A color image signal evaluating apparatus according to claim 6, wherein said calculating means includes means whereby a histogram of said saturation image data read out of said saturation image memory is produced to determine a mode saturation value and said reference saturation value is determined corresponding to said mode saturation value.

8. A color image signal evaluating apparatus according to claim 6, wherein said calculating means includes means for determining X and Y coordinate positions where said X and Y integrated counts become maximum in each of said color matrix memories and for determining said reference integrated saturation values based on said X and Y integrated saturation values of said X and Y coordinate positions in the corresponding one of said saturation memories.

9. A color image signal evaluating apparatus comprising:
  color image signal transform means for transforming a color image signal to hue image data and saturation image data;
  a hue image memory, operatively connected to said color image signal transform means, for storing at least one frame of said hue image data provided from said color image signal transform means;
  a saturation image memory, operatively connected to said color image signal transform means, for storing at least one frame of said saturation image data provided from said color image signal transform means;
  color matrix memories each provided corresponding to one of a plurality of predetermined colors and having a storage area corresponding to pixel positions of at least one frame;
  color saturation memories each provided corresponding to one of said plurality of colors and having storage positions corresponding to pixel positions of at least one frame; and
  calculating mans for reading out and comparing said saturation image data corresponding to each pixel position with a reference saturation value, for identifying the color which is represented by said hue image data corresponding to the pixel position having a saturation value greater than said reference saturation value and read out of said hue image memory, for writing a "1" in the corresponding pixel position in one of said color matrix memories corresponding to said identified color, for writing a value corresponding to said saturation image data in the corresponding pixel position in one of said color saturation memories corresponding to said identified color, for integrating stored contents of each of said color matrix memories in X and Y directions to obtain X and Y integrated counts, weighting X and Y integrated counts by a predetermined window function which becomes large in a center of a display screen, for integrating the contents of each of said color saturation memories in the X and Y directions to obtain X and Y integrated saturation values, for comparing the X and Y integrated saturation values with a reference integrated saturation value, for defining widths of those of said X and Y integrated saturation values which are greater than said reference saturation value as the widths of vertical and lateral striped patterns of the corresponding color, for storing a sum of the saturation values at the pixel positions in each of said striped patterns in each of said color saturation memories, for calculating a standard deviation of saturation values in each said saturation color memory and a standard deviation of the pixel positions having stored therein said "1" in the corresponding one of said color saturation memories in connection with the X and Y directions, for dividing a product of said sum of saturation values and said standard deviation of saturation, and for outputting a value corresponding to the divided result as a center striped pattern factor.

10. A color image signal evaluating apparatus according to claim 9, wherein said calculating means includes means whereby a histogram of said saturation image data read out of said saturation image memory is produced to determine a mode saturation value and said reference saturation value is determined corresponding to said mode saturation value.

11. A color image signal evaluating apparatus according to claim 9, wherein said calculating means includes means for determining X and Y coordinate positions where said X and Y integrated counts become maximum in each of said color matrix memories and for determining said reference integrated saturation value based on said X and Y integrated saturation values at said X and Y coordinate positions in the corresponding one of said color saturation memories.

12. A color image signal evaluating apparatus according to claim 9, wherein said calculating means includes means whereby saturation emphasized by histogram flattening of said saturation image data read out of said saturation image memory is written, as a value corresponding to said saturation image data, into the corresponding color saturation memory.

13. A color image signal evaluating apparatus comprising:
  a plurality of color reproduction error detecting means each supplied with a color image signal, for quantitatively detecting a different kind of color reproduction error;

coefficient generating means for generating coefficients corresponding to said different kinds of color reproduction errors;

multiplying means for multiplying the output of each of said color reproduction error detecting means and the corresponding one of said coefficients from said coefficient generating means;

adding means for adding together the multiplied outputs; and detecting means for comparing the added output from said adding means with a reference value to decide, based on the compared result, whether said color image signal is good or not.

14. A color image signal evaluating apparatus according to claim 13, wherein said plurality of color reproduction error detecting means includes:
   basic chromaticity detecting means;
   slanted striped pattern factor detecting means;
   border striped pattern factor detecting means; and
   center striped pattern factor detecting means.

15. A color image signal evaluating apparatus comprising:
   color image signal transform means for transforming a color image signal to hue image data and saturation image data;
   a hue image memory, operatively connected to said color image signal transform means, for storing at least one frame of said hue image data provided from said color image signal transform means;
   a saturation image memory, operatively connected to said color image signal transform means, for storing at least one frame of said saturation image data provided from said color image signal transform means;
   color matrix memories each provided corresponding to one of a plurality of predetermined colors and having storage positions corresponding to pixel positions of at least one frame;
   color saturation memories each provided corresponding to one of said plurality of colors and having storage positions corresponding to pixel positions of at least one frame;
   color identifying means for identifying which of said plurality of colors said hue image data read out of said hue image memory belongs;
   a basic chromaticity calculating circuit, operatively connected to said saturation image memory, for averaging said saturation image data read out of said saturation image memory for each pixel block of a predetermined size to obtain a mean saturation value, obtaining a maximum one of said means saturation values for each of a predetermined number of pixel block sizes, and outputting a value corresponding to a sum of such maximum mean saturation values as basic chromaticity;
   color matrix memory write means for comparing said saturation image data read out of said saturation image memory with a reference saturation value, when said saturation image data is greater than said reference saturation value a "1" is written into the corresponding pixel position of the tone of said color matrix memories corresponding pixel position of a tone of said color matrix memories corresponding to the color identified by said color identifying means in connection with said hue image data read out of said hue image memory at the corresponding pixel position;
   a slanted striped pattern factor calculating circuit for calculating a correlation coefficient for X and Y coordinates of said pixel positions having written therein said "1" in one of said color matrix memories and for outputting as a slanted striped pattern factor a value corresponding to said correlation coefficient;
   color saturation image memory write means for writing said saturation image data read out of said saturation image memory and decided to be above said reference saturation value at the corresponding pixel positions in one of said color saturation memories of the corresponding color;
   an integrated count calculating circuit for integrating the stored contents of each of said color matrix memories in Y and X directions to obtain X and Y integrated counts and for weighting each of said X and Y integrated counts by a predetermined window function;
   striped pattern width detecting means for integrating the contents of each of said color saturation memories in the Y and X directions to obtain X and Y integrated saturation values and for comparing each of said X and Y integrated saturation values with a reference integrated saturation value, widths of said X and Y integrated saturation values exceeding said reference integrated saturation value are defined as the widths of vertical and lateral striped patterns of the corresponding color;
   a border striped pattern factor calculating circuit for calculating a sum of saturation values at pixel positions in each of said striped patterns on each of said color saturation memories, a standard deviation of the pixel positions having "1" in the corresponding color matrix memory, and the sums of said X and Y integrated counts in each of said striped patterns, for multiplying said sum of saturation values, said deviation and said sums of integrated counts for said vertical and lateral patterns, and for outputting, as a border striped pattern factor, a value corresponding to the multiplied result; and
   a center striped pattern factor calculating circuit, operatively connected to said color saturation memories and said color matrix memories, for calculating said sum of saturation values at pixel positions in each of said striped patterns on each of said color saturation memories and a standard deviation of the pixel positions having "1" in the corresponding one of said color matrix memories are calculated in connection with the X and Y directions, the product of said sum of saturation values and said standard deviation is divided by said standard deviation of pixel positions, and a value corresponding to the divided result is outputted as a center striped pattern factor.

16. A color image signal evaluating apparatus according to claim 15, further comprising:
   coefficient generating means for generating predetermined coefficients corresponding to basic chromaticity, a slanted striped pattern, a border striped pattern and a center striped pattern, respectively;
   multiplying means for multiplying the outputs of said basic chromaticity calculating circuit, said slanted striped pattern factor calculating circuit, said border striped pattern factor calculating circuit and said center striped pattern factor calculating circuit by said coefficients corresponding thereto, respectively;

adding means for adding together the multiplied outputs from said multiplying means; and deciding means for comparing the added output of said adding means with a reference value to decide the quality of said color image signal based on the compared result.

* * * * *

UNITED STATES PATENT AND TRADEMARK OFFICE
CERTIFICATE OF CORRECTION

PATENT NO. : 5,204,948
DATED : APRIL 20, 1993
INVENTOR(S) : HARUO KATO

It is certified that error appears in the above-indentified patent and that said Letters Patent is hereby corrected as shown below:

Col. 4, line 57, "included" should be --include--.

Col. 5, line 21, "from" should be deleted.

Col. 6, line 2, "frame" should be --frame of--;
line 10, "size," should be --size--;
line 26, "7" should be deleted.

Col. 7, line 16, "in" should be --in the first--.

Col. 9, line 56, (formula 3), "x)$^2$" should be --$\bar{x})^2$--;

line 61, (formula 4), "y)$^2$" should be --$\bar{y})^2$--;

line 63, (formula 5), "y)" should be --$\bar{y})$--.

Col. 12, line 11, "Tuckey" should be --Turkey--;
line 54, "that is" should be --that is,--.

Col. 16, line 67, (formula 16), "Sx)$^2$" should be --$\bar{Sx})^2$--.

UNITED STATES PATENT AND TRADEMARK OFFICE
CERTIFICATE OF CORRECTION

PATENT NO. : 5,204,948
DATED : APRIL 20, 1993
INVENTOR(S) : HARUO KATO

It is certified that error appears in the above-indentified patent and that said Letters Patent is hereby corrected as shown below:

Col. 17, line 3, (formula 17), "Sy)$^2$" should be --$\overline{S}$y)$^2$--;
line 26, (formula 20), "+" (both occurrences) should be -- ÷ --;
line 28, (formula 21), "+" (both occurrences) should be -- ÷ --;
line 31, (formula 22), "+" (first occurrence) should be -- ÷ --;
line 33, formula "(22)" should be --(23)--; and "+" (first occurrence) should be -- ÷ --.

Signed and Sealed this

Eighth Day of March, 1994

Attest:

BRUCE LEHMAN

*Attesting Officer*    *Commissioner of Patents and Trademarks*